US012607578B2

(12) United States Patent
Determan et al.

(10) Patent No.: US 12,607,578 B2
(45) Date of Patent: Apr. 21, 2026

(54) ACCELERATED HIGHER RESOLUTION INDUSTRIAL RADIOGRAPHY

(71) Applicant: ILLINOIS TOOL WORKS INC., Glenview, IL (US)

(72) Inventors: Lucas Determan, Maple Grove, MN (US); Joseph Schlecht, Edina, MN (US); Eric Ferley, Minneapolis, MN (US)

(73) Assignee: Illinois Tool Works Inc., Glenview, IL (US)

( * ) Notice: Subject to any disclaimer, the term of this patent is extended or adjusted under 35 U.S.C. 154(b) by 176 days.

(21) Appl. No.: 18/656,760

(22) Filed: May 7, 2024

(65) Prior Publication Data

US 2025/0347635 A1 Nov. 13, 2025

Related U.S. Application Data

(60) Provisional application No. 63/521,159, filed on Jun. 15, 2023.

(51) Int. Cl.
G01N 23/046 (2018.01)
G01N 23/04 (2018.01)
(Continued)

(52) U.S. Cl.
CPC ............. G01N 23/18 (2013.01); G01N 23/04 (2013.01); G01N 23/046 (2013.01);
(Continued)

(58) Field of Classification Search
CPC .... G01N 23/04; G01N 23/043; G01N 23/046; G01N 23/083; G01N 23/087;
(Continued)

(56) References Cited

U.S. PATENT DOCUMENTS 4,989,225 A * 1/1991 Gupta .................. G01N 23/046
378/10
5,012,498 A * 4/1991 Cuzin .................. G01N 23/046
250/370.15
(Continued)

FOREIGN PATENT DOCUMENTS

WO 2024059420 3/2024

OTHER PUBLICATIONS

European Patent Office, Search Report, Application No. 24180891.
4, dated Oct. 24, 2024, 8 pages.
(Continued)

*Primary Examiner* — Allen C. Ho
(74) *Attorney, Agent, or Firm* — McAndrews, Held & Malloy, Ltd.

(57) ABSTRACT

Example industrial radiography systems allow for generation of higher resolution 2D radiographs using an accelerated higher resolution radiograph process. The accelerated higher resolution radiograph process uses pixel (e.g., grayscale) values from one or more lower resolution 2D radiographs to set pixel values for a first portion of higher resolution radiograph pixels of a higher resolution 2D radiograph. The remaining portion of the higher resolution radiograph pixels are set based on an analysis of the first portion. The accelerated higher resolution radiograph process is faster than more traditional processes because the accelerated higher resolution radiograph process necessitates fewer lower resolution radiographs be captured, and therefore saves time and/or lower wear and tear on the radiography machine, while still providing quality higher resolution 2D radiographs.

20 Claims, 8 Drawing Sheets

(51) Int. Cl.
G01N 23/083 (2018.01)
G01N 23/087 (2018.01)
G01N 23/18 (2018.01)
H04N 23/30 (2023.01)
H04N 23/951 (2023.01)

(52) U.S. Cl.
CPC ......... G01N 23/083 (2013.01); G01N 23/087 (2013.01); H04N 23/30 (2023.01); H04N 23/951 (2023.01); *G01N 2223/1016* (2013.01); *G01N 2223/304* (2013.01); *G01N 2223/401* (2013.01); *G01N 2223/408* (2013.01); *G01N 2223/42* (2013.01); *G01N 2223/421* (2013.01); *G01N 2223/50* (2013.01); *G01N 2223/501* (2013.01)

(58) Field of Classification Search
CPC .................. G01N 23/10; G01N 23/18; G01N 2223/1016; G01N 2223/304; G01N 2223/401; G01N 2223/408; G01N 2223/42; G01N 2223/421; G01N 2223/50; G01N 2223/501; H04N 23/30; H04N 23/951
USPC ....... 378/10, 15, 19, 57, 58, 62, 98.8, 98.12, 378/189, 196–198, 210, 901
See application file for complete search history.

(56) References Cited

U.S. PATENT DOCUMENTS

| | | | | |
|---|---|---|---|---|
| 5,119,408 A * | 6/1992 | Little | ................... | G01N 23/046 378/10 |
| 5,712,893 A * | 1/1998 | Dykster | ................ | G01N 23/04 378/205 |
| 6,104,776 A * | 8/2000 | Oikawa | ................ | G01N 23/083 378/57 |
| 6,459,760 B1 * | 10/2002 | D'Ambrosio | .......... | G01N 23/04 378/207 |
| 7,136,454 B2 | 11/2006 | Gerndt et al. | | |
| 7,356,115 B2 * | 4/2008 | Ford | ................... | G01N 23/046 378/57 |
| 7,492,862 B2 * | 2/2009 | Bendahan | ............. | G01V 5/281 378/57 |
| 7,844,027 B2 * | 11/2010 | Harding | .................. | G01V 5/00 378/57 |
| 7,876,875 B2 * | 1/2011 | Warner | ............... | G01N 23/046 378/57 |
| 8,422,626 B2 * | 4/2013 | Jin | ....................... | G01N 23/046 378/10 |
| 9,459,217 B2 | 10/2016 | Wang et al. | | |
| 10,247,682 B2 | 4/2019 | Schlecht et al. | | |
| 10,413,259 B2 * | 9/2019 | Schlecht | ............... | G01N 23/04 |
| 10,705,030 B2 * | 7/2020 | Watanabe | .............. | G01N 23/18 |
| 11,573,190 B2 * | 2/2023 | Kon | ....................... | G01N 23/18 |
| 11,619,597 B2 * | 4/2023 | Schlecht | ............. | G01N 23/046 700/262 |
| 11,656,189 B2 * | 5/2023 | Ueki | ................... | G01N 23/046 378/10 |
| 11,706,379 B2 * | 7/2023 | Harada | ................. | H04N 23/30 378/98.8 |
| 12,281,993 B2 * | 4/2025 | Lemmer | ............... | G01N 23/04 |
| 12,298,260 B2 * | 5/2025 | Schlecht | ............... | G01N 23/18 |
| 12,429,435 B2 * | 9/2025 | Lemmer | ............... | G01N 23/04 |
| 2022/0166942 A1 | 5/2022 | Harada | | |

OTHER PUBLICATIONS

European Patent Office, Office Action, Application No. 24180891. 4-1001, dated Nov. 11, 2025, 7 pages.

* cited by examiner

Higher Resolution 2D Radiograph

Lower Resolution 2D Radiograph

ACCELERATED HIGHER RESOLUTION INDUSTRIAL RADIOGRAPHY

CROSS REFERENCE TO RELATED APPLICATIONS

This application claims priority to, and the benefit of, U.S. Provisional Patent Application No. 63/521,159, filed Jun. 15, 2023, entitled "Accelerated Higher Resolution Industrial Radiography," the entire content of which is hereby incorporated by reference.

TECHNICAL FIELD

The present disclosure generally relates to industrial radiography and, more particularly, to accelerated, higher resolution, industrial radiography.

BACKGROUND

Industrial radiography systems are used to acquire two dimensional (2D) radiographic images of parts used in industrial applications. Such industrial applications might include, for example, aerospace, automotive, electronic, medical, pharmaceutical, military, and/or defense applications. The 2D radiographic images may be inspected to check the part(s) for cracks, flaws, and/or defects that may or may not normally be visible to the human eye.

Limitations and disadvantages of conventional and traditional approaches will become apparent to one of skill in the art, through comparison of such systems with the present disclosure as set forth in the remainder of the present application with reference to the drawings.

BRIEF SUMMARY

The present disclosure is directed to accelerated, higher resolution, industrial radiography, substantially as illustrated by and/or described in connection with at least one of the figures, and as set forth more completely in the claims.

These and other advantages, aspects and novel features of the present disclosure, as well as details of an illustrated example thereof, will be more fully understood from the following description and drawings.

Figure 1:
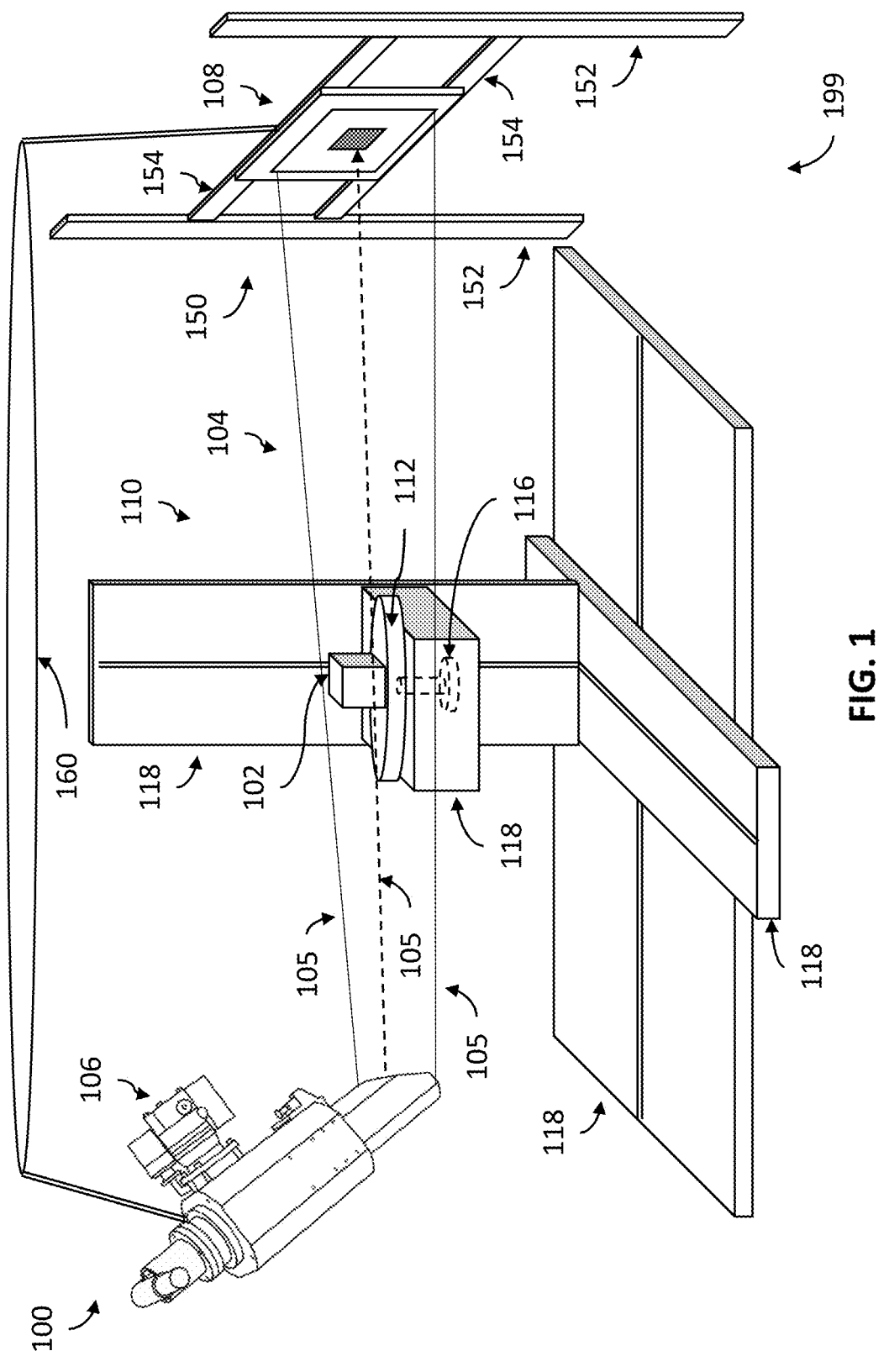
FIG. 1 shows an example of an industrial X-ray radiography machine, in accordance with aspects of this disclosure.

The figures are not necessarily to scale. Where appropriate, the same or similar reference numerals are used in the figures to refer to similar or identical elements. For example, reference numerals utilizing lettering (e.g., lower resolution 2D radiograph 500a, higher resolution 2D radiograph 500b) refer to instances of the same reference numeral that does not have the lettering (e.g., 2D radiographs 500).

DETAILED DESCRIPTION

Some examples of the present disclosure relate to industrial radiography systems that generate higher resolution 2D radiographs that are more detailed than normal using an accelerated sub-pixel sampling process. In some examples, pixel (e.g., grayscale) values of lower resolution radiograph pixels from one or more lower resolution 2D radiographs are used to set pixel values for a first portion of higher resolution radiograph pixels in a higher resolution 2D radiograph. Pixel values for the remaining portion of the higher resolution pixels may then be set based on an analysis of the pixel values from the first portion of higher resolution radiograph pixels. This technique of directly setting only a portion, rather than all, of the higher resolution pixels using lower resolution 2D radiographs, means fewer lower resolution 2D radiographs need be captured, thereby saving time and/or reducing wear and tear, as compared with some other, more traditional, techniques, while still providing quality higher resolution 2D radiographs. The time saved using the accelerated sub-pixel sampling process (and/or reduced wear and tear) is even more pronounced when several higher resolution 2D radiographs are generated and/or combined to form a three-dimensional (3D) radiographic volume, model, and/or image.

Some examples of the present disclosure relate to a non-transitory computer readable medium, comprising machine readable instructions which, when executed by processing circuitry, cause the processing circuitry to: capture a lower resolution radiograph of a sample using radiation emitted by a radiation emitter and detected by a radiation detector, the sample being positioned between the radiation emitter and the radiation detector in a radiation path of the radiation; and generate a higher resolution radiograph of the sample based on the lower resolution radiograph, the higher resolution radiograph comprising more pixels than the lower resolution radiograph, the higher resolution radiograph having higher resolution pixels, and the higher resolution radiograph being generated by: setting first higher resolution pixel values for a first portion of the higher resolution pixels based on lower resolution pixel values of the lower resolution radiograph, and setting remaining higher resolution pixel values for a remaining portion of the higher resolution pixels of the higher resolution radiograph using an analysis of the first higher resolution pixel values for the first portion of the higher resolution pixels.

In some examples, the lower resolution radiograph comprises a first lower resolution radiograph of the sample while the radiation detector is at a first detector position and the sample is at a sample orientation relative to the radiation emitter or the radiation detector, the lower resolution pixel values comprising first lower resolution pixel values, the non-transitory computer readable medium further comprising machine readable instructions which, when executed by the processing circuitry, cause the processing circuitry to: capture a second lower resolution radiograph of the sample while the radiation detector is at a second detector position and the sample is at the sample orientation, wherein the first higher resolution pixel values for the first portion of the higher resolution pixels are set based on the first lower resolution pixel values of the first lower resolution radiograph and second lower resolution pixel values of the second lower resolution radiograph.

In some examples, the radiation detector includes a detector surface comprising a plurality of detector pixels, each detector pixel of the plurality of detector pixels having a detector pixel size defined by a detector pixel width along a first detector axis and a detector pixel height along a second detector axis that is perpendicular to the first detector axis, the second detector position being offset from the first detector position by a first distance along the first detector axis or a second distance along the second detector axis, the first distance, being less than the detector pixel width, or the second distance being less than the detector pixel height. In some examples, the non-transitory computer readable medium further comprises machine readable instructions which, when executed by the processing circuitry, cause the processing circuitry to: move the radiation detector from the first detector position to the second detector position using a positioning system. In some examples, the non-transitory computer readable medium further comprises machine readable instructions which, when executed by the processing circuitry, cause the processing circuitry to display a visual representation of the higher resolution radiograph on a display screen.

In some examples, the non-transitory computer readable medium further comprises machine readable instructions which, when executed by the processing circuitry, cause the processing circuitry to apply an enhancement to the higher resolution pixels of the higher resolution radiograph. In some examples, the non-transitory computer readable medium further comprises machine readable instructions which, when executed by the processing circuitry, cause the processing circuitry to construct a three dimensional higher resolution radiographic volume using the higher resolution radiograph and one or more additional higher resolution radiographs.

Some examples of the present disclosure relate to an industrial radiography imaging system, comprising: a radiation emitter configured to emit radiation along a radiation path; a radiation detector positioned in the radiation path of the radiation, the radiation detector configured to detect the radiation emitted by the radiation emitter; a sample support positioned between the radiation emitter and the radiation detector, the sample support configured to support a sample at a sample position in the radiation path of the radiation; and an image acquisition system, the image acquisition system comprising: processing circuitry, and memory circuitry comprising machine readable instructions which, when executed by the processing circuitry, cause the processing circuitry to: capture a lower resolution radiograph of the sample using the radiation detected by the radiation detector, and generate a higher resolution radiograph of the sample based on the lower resolution radiograph, the higher resolution radiograph comprising more pixels than the lower resolution radiograph, the higher resolution radiograph having higher resolution pixels, and the higher resolution radiograph being generated by: setting first higher resolution pixel values for a first portion of the higher resolution pixels based on lower resolution pixel values of the lower resolution radiograph, and setting remaining higher resolution pixel values for a remaining portion of the higher resolution pixels of the higher resolution radiograph using an analysis of the first higher resolution pixel values for the first portion of the higher resolution pixels.

In some examples, the lower resolution radiograph comprises a first lower resolution radiograph of the sample while the radiation detector is at a first detector position and the sample is at a sample orientation relative to the radiation emitter or the radiation detector, the lower resolution pixel values comprising first lower resolution pixel values, and the memory circuitry further comprising machine readable instructions which, when executed by the processing circuitry, cause the processing circuitry to: capture a second lower resolution radiograph of the sample while the radiation detector is at a second detector position and the sample is at the sample orientation, wherein the first higher resolution pixel values for the first portion of the higher resolution pixels are set based on the first lower resolution pixel values of the first lower resolution radiograph and second lower resolution pixel values of the second lower resolution radiograph.

In some examples, the radiation detector includes a detector surface comprising a plurality of detector pixels, each detector pixel of the plurality of detector pixels having a detector pixel size defined by a detector pixel width along a first detector axis and a detector pixel height along a second detector axis that is perpendicular to the first detector axis, the second detector position being offset from the first detector position by a first distance along the first detector axis or a second distance along the second detector axis, the first distance being less than the detector pixel width, or the second distance being less than the detector pixel height.

In some examples, the system further comprises a positioning system configured to move the radiation detector from the first detector position to the second detector position. In some examples, the image acquisition system further comprises a display screen configured to display a visual representation of the higher resolution radiograph. In some examples, the memory circuitry further comprises machine readable instructions which, when executed by the processing circuitry, cause the processing circuitry to: apply an enhancement to the higher resolution pixels of the higher resolution radiograph. In some examples, the memory circuitry further comprises machine readable instructions which, when executed by the processing circuitry, cause the processing circuitry to: construct a three dimensional higher resolution radiographic volume using the higher resolution radiograph and one or more additional higher resolution radiographs.

Some examples of the present disclosure relate to a method for accelerated generation of a higher resolution radiograph, the method comprising: capturing a lower resolution radiograph of a sample using radiation emitted by a radiation emitter and detected by a radiation detector, the sample being positioned between the radiation emitter and the radiation detector in a radiation path of the radiation; and generating, via processing circuitry, a higher resolution radiograph of the sample based on the lower resolution radiograph, the higher resolution radiograph comprising more pixels than the lower resolution radiograph, the higher resolution radiograph having higher resolution pixels, and the higher resolution radiograph being generated by: setting, via the processing circuitry, first higher resolution pixel values for a first portion of the higher resolution pixels based on lower resolution pixel values of the lower resolution radiograph, and setting, via the processing circuitry, remaining higher resolution pixel values for a remaining portion of the higher resolution pixels of the higher resolution radiograph using an analysis of the first higher resolution pixel values for the first portion of the higher resolution pixels.

In some examples, the lower resolution radiograph comprises a first lower resolution radiograph of the sample while the radiation detector is at a first detector position and the sample is at a sample orientation relative to the radiation emitter or the radiation detector, the lower resolution pixel values comprising first lower resolution pixel values, the method further comprising: capturing a second lower resolution radiograph of the sample using the radiation detector while the radiation detector is at a second detector position and the sample is at the sample orientation, wherein the first higher resolution pixel values for the first portion of the higher resolution pixels are set based on the first lower resolution pixel values of the first lower resolution radiograph and second lower resolution pixel values of the second lower resolution radiograph.

In some examples, the radiation detector includes a detector surface comprising a plurality of detector pixels, each detector pixel of the plurality of detector pixels having a detector pixel size defined by a detector pixel width along a first detector axis and a detector pixel height along a second detector axis that is perpendicular to the first detector axis, the second detector position being offset from the first detector position by a first distance along the first detector axis or a second distance along the second detector axis, the first distance being less than the detector pixel width, or the second distance being less than the detector pixel height.

In some examples, the method further comprises moving the radiation detector from the first detector position to the second detector position using a positioning system. In some examples, the method further comprises applying an enhancement to the higher resolution pixels of the higher resolution radiograph via the processing circuitry; and displaying a visual representation of the higher resolution radiograph on a display screen. In some examples, the method further comprises constructing, via the processing circuitry, a three dimensional higher resolution radiographic volume using the higher resolution radiograph and one or more additional higher resolution radiographs.

FIG. 1 shows an example industrial X-ray radiography machine 100. In some examples, the X-ray radiography machine 100 may be used to perform non-destructive testing (NDT), digital radiography (DR) scans, computerized tomography (CT) scans, and/or other applications on a sample 102. In some examples, the sample 102 may be an industrial component and/or an assembly of components (e.g., an engine cast, microchip, bolt, etc.). In some examples, the sample 102 may be relatively small, such that a finer, more detailed, higher resolution radiography (e.g., radiographic imaging) process may be useful. While primarily discussed in terms of X-rays for the sake of simplicity, in some examples, the industrial X-ray radiography machine 100 discussed herein may use radiation in other wavelengths (e.g., Gamma, Neutron, etc.).

In the example of FIG. 1, the X-ray radiography machine 100 directs X-ray radiation 104 from an X-ray emitter 106 along a radiation path 105. The emitted radiation proceeds along the radiation path 105, passes through the sample 102, and subsequently impacts (and/or is detected by) an X-ray detector 108. In some examples, the X-ray emitter 106 may comprise an X-ray tube configured to emit cone or fan shaped X-ray radiation. In some examples, the X-ray emitter 106 may emit X-ray radiation within an energy range of 20 kiloelectron volts (keV) to 10 megaelectron volts (meV).

In some examples, two dimensional (2D) digital radiographs (e.g., radiographic images, X-ray images, etc.) may be generated based on the X-ray radiation 104 incident on the X-ray detector 108. In some examples, the 2D radiographs may be generated by the X-ray detector 108 itself. In some examples, the 2D radiographs may be generated by the X-ray detector 108 in combination with a computing system 202 (see, e.g., FIG. 2) in communication with the X-ray detector 108 and/or X-ray radiography machine 100.

In some examples, the 2D radiographs generated by the X-ray detector 108 (and/or associated computing system(s)) may be combined to form three dimensional (3D) radiographic volumes and/or images. In some examples, 2D image slices of the 3D volumes/images may also be formed. While the term "image" and/or "radiograph" is used herein as a shorthand, it should be understood that an "image" and/or "radiograph" may comprise representative data until that data is visually rendered by one or more appropriate components (e.g., a display screen, a graphic processing unit, an X-ray detector 108, etc.).

In some examples, the X-ray detector 108 may comprise a flat panel detector (FDA), a linear diode array (LDA), and/or a lens-coupled scintillation detector. In some examples, the X-ray detector 108 may comprise a fluoroscopy detection system and/or a digital image sensor configured to receive an image indirectly via scintillation. In some examples, the X-ray detector 108 may be implemented using a sensor panel (e.g., a charge coupled device (CCD) panel, a complementary metal-oxide-semiconductor (CMOS) panel, etc.) configured to receive the X-rays directly, and to generate the digital images. In some examples, the X-ray detector 108 may include a scintillation layer/screen that absorbs X-rays and emits visible light photons that are, in turn, detected by a solid-state detector panel (e.g., a CMOS X-ray panel and/or CCD X-ray panel) coupled to the scintillation screen.

Figure 4:
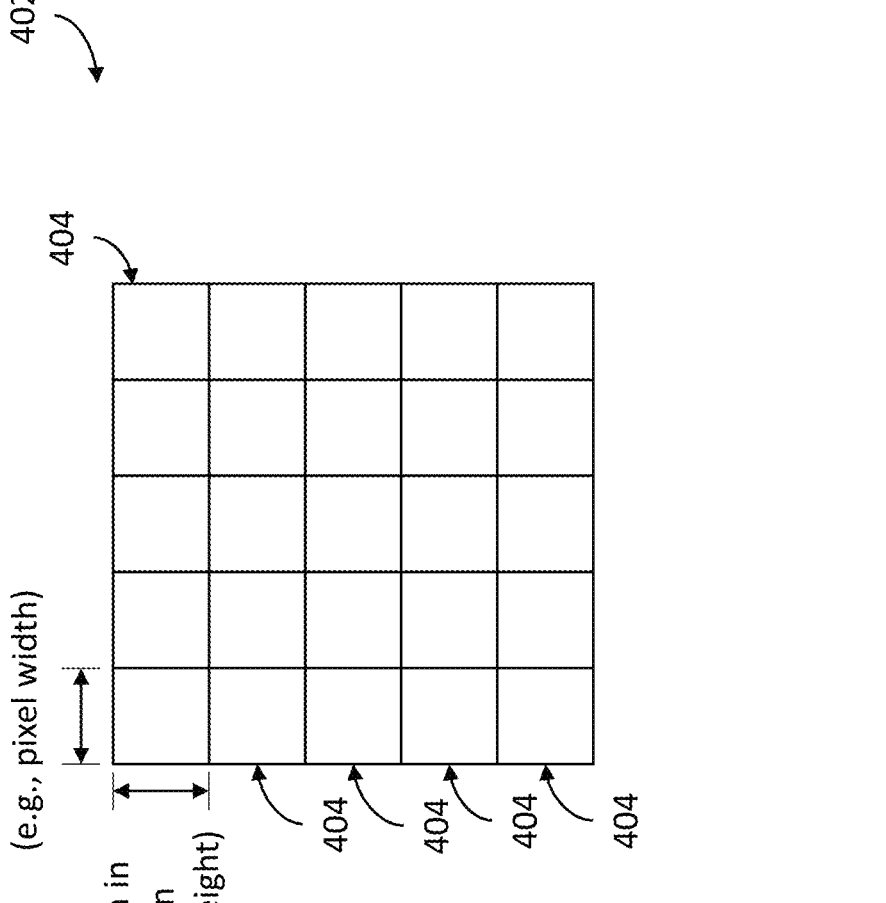
FIG. 4 illustrates an example detector pixel grid of the X-ray detector 108 of the industrial X-ray radiography machine of FIG. 1, in accordance with aspects of this disclosure.

In some examples, the X-ray detector 108 (e.g., the solid state detector panel) may include detector pixels 404 (see, e.g., FIG. 4). In some examples, the detector pixels 404 may correspond to portions of a scintillation screen. In some examples, the size of each detector pixel 404 may range from tens to hundreds of micrometers. In some examples, the pixel size of the X-ray detector 108 may be in the range of 25 micrometers to 250 micrometers (e.g., 200 micrometers). In some examples, the detector pixels 404 may be arranged in a detector pixel grid 402 on the X-ray detector 108.

FIG. 4 shows an example of a detector pixel grid 402 comprised of several detector pixels 404. As shown, each detector pixel 404 has a pixel size, determined by a pixel height (e.g., in the y axis) and a pixel width (e.g., in the x axis). In some examples, the x axis may be approximately parallel (e.g., within 1-5 degrees) to one or more rails 154 of a detector positioner 150 (discussed below with respect to FIG. 1). In some examples, the y axis may be approximately parallel to one or more pillars 152 of the detector positioner 150 (discussed below with respect to FIG. 1). While the detector pixels 404 are shown as squares in the example of FIG. 4, with equal pixel heights and pixel widths, in some examples, the detector pixels 404 may be rectangles with pixel heights that are not equal to the pixel widths. For convenience, the term "pixel length" may be used in the following disclosure to refer to either/both pixel height and/or pixel width.

Figure 5B:
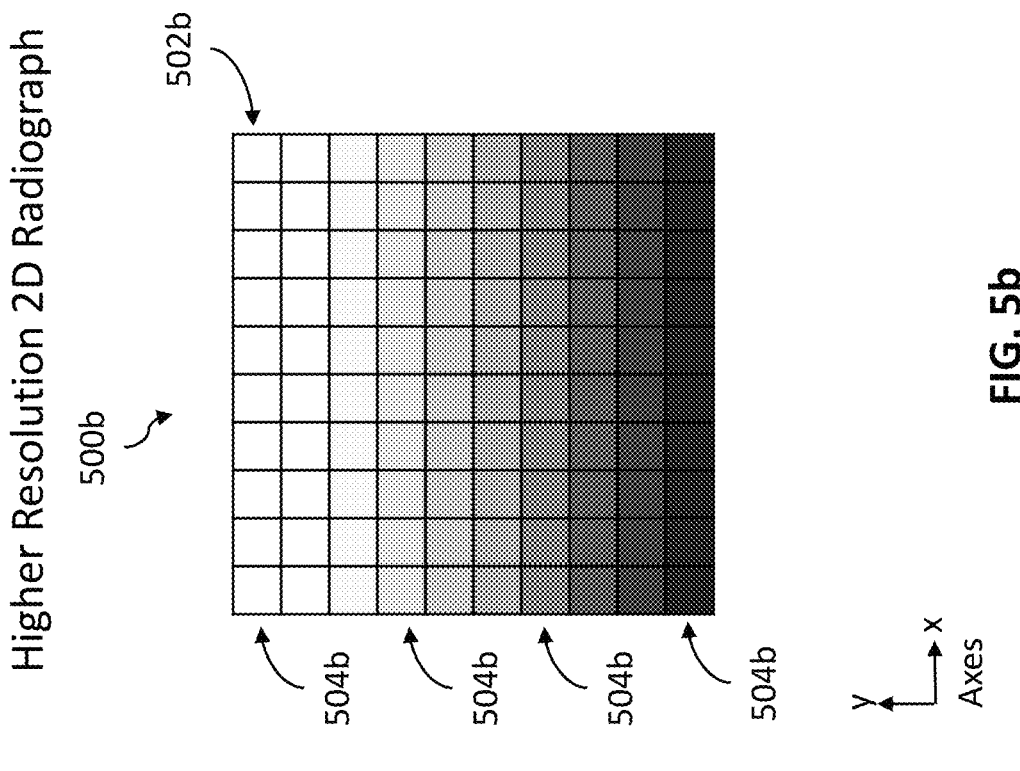
FIGS. 5a-5b illustrate example radiograph pixel grids, in accordance with aspects of this disclosure.
Figure 5A:
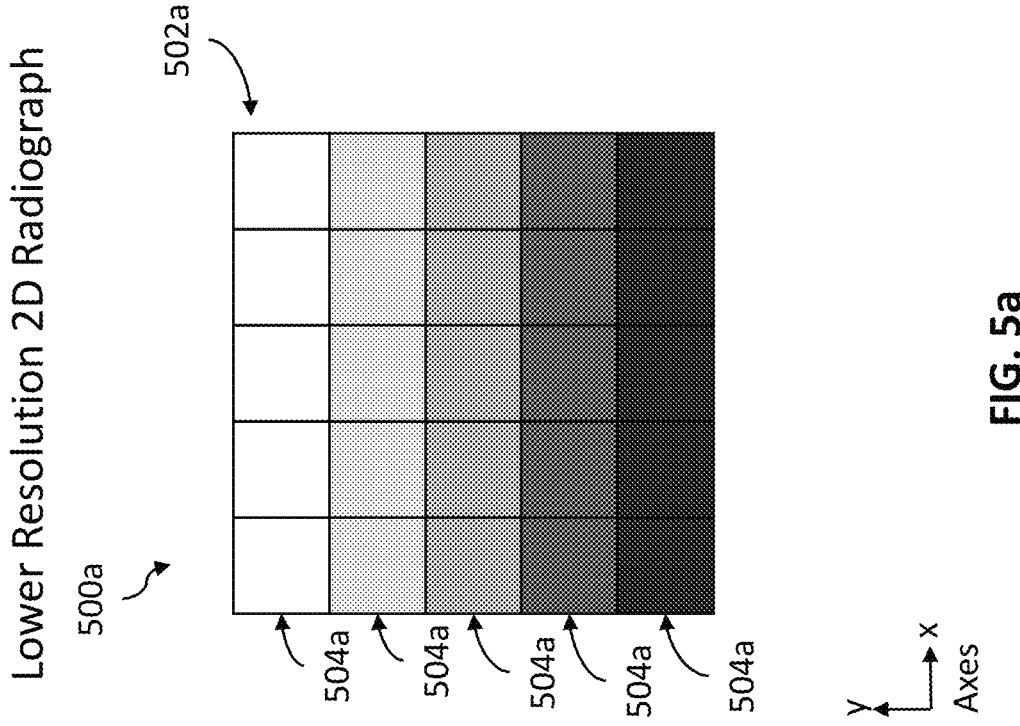

In some examples, when a 2D radiograph 500a is generated, the 2D radiograph 500a is represented using an arrangement (e.g., a radiograph pixel grid 502a) of radiograph pixels 504a (see, e.g., FIG. 5a). In some examples, each 2D radiograph 500a captured using X-ray detector 108 may have the same number (and/or same arrangement) of radiograph pixels 504 as the X-ray detector 108 has detector pixels 404. In some examples, each radiograph pixel 504 may have an associated pixel (e.g., grayscale) value that is set based on radiation detected by the X-ray detector 108 proximate a corresponding detector pixel 404. A computing system 202 and/or user interface (UI) 204 (see, e.g., FIG. 2) may thereafter output a visual representation (e.g., image) of the 2D radiograph 500a on a display screen (having its own display screen pixels) by appropriately arranging the same number of display screen pixels in the same way as the radiograph pixels 504, with each display screen pixel having a display screen pixel value that is the same as (and/or correlated with, based on, etc.) the pixel value of the corresponding radiograph pixel 504.

FIG. 5a shows a simple example of a 2D radiograph 500a. In the example of FIG. 5a, the 2D radiograph 500a is represented by several radiograph pixels 504a arranged in a radiograph pixel grid 502a. As shown, each radiograph pixel 504a in a given row (e.g., along the x axis) of the radiograph pixel grid 502a is the same shade of gray, indicating common pixel (e.g., grayscale) values of those radiograph pixels 504a. In contrast, each radiograph pixel 504a in a given column (e.g., along the y axis) is a different shade of gray than every other radiograph pixel 504a in the column, indicating different pixel (e.g., grayscale) values of each radiograph pixel 504a in the column.

In some examples, the size of each detector pixel 404 of the X-ray detector 108 may be a limiting factor in the resolution, or detail, of a 2D radiograph 500a captured by the X-ray detector 108 (and/or associated computing system 202). This may be an issue where a sample 102 contains features finer (e.g., smaller, denser, etc.) than the pixel size of the detector pixels 404 of the X-ray detector 108.

For example, a computer microchip may have very fine features that are smaller than the size of a detector pixel 404. As each detector pixel 404 (and/or corresponding radiograph pixel 504a) can only have one pixel (e.g., grayscale) value, granular differences that occur (e.g., in color and/or grayscale) at a scale smaller than the size of the detector pixel 404 may be lost. In such examples, it may be useful to use sub-pixel (e.g., less/smaller than a detector pixel 404) sampling to construct a higher resolution 2D radiograph 500b (see, e.g., FIG. 5b) that has higher resolution radiograph pixels 504b with the ability to express more detail than possible with the lower resolution 2D radiographs 500a captured using the X-ray detector 108. As used herein, "sub-pixel sampling" refers to a process of constructing a higher resolution 2D radiograph 500b using several lower resolution 2D radiographs 500a that are captured at different detector positions of the X-ray detector 108, where each detector position is offset from at least one other detector position (and/or all other detector positions) by a sub-pixel (e.g., less than a pixel length of a detector pixel 404).

FIG. 5b shows an example of a higher resolution 2D radiograph 500b. Like the lower resolution 2D radiograph 500a in FIG. 5a, the higher resolution 2D radiograph 500b in FIG. 5b is represented by several higher resolution radiograph pixels 504b arranged in a radiograph pixel grid 502b. However, the higher resolution 2D radiograph 500b in FIG. 5b has a higher pixel density than the lower resolution 2D radiograph 500a in FIG. 5a (and/or the detector pixel grid 402 in FIG. 4). That is, the higher resolution 2D radiograph 500b in FIG. 5b is shown as having more (and smaller) higher resolution radiograph pixels 504b than the lower resolution 2D radiograph 500a in FIG. 5a (and/or the detector pixel grid 402 in FIG. 4).

In particular, the higher resolution 2D radiograph 500b in FIG. 5b is shown as having four times as many higher resolution radiograph pixels 504b than the lower resolution 2D radiograph 500a has lower resolution radiograph pixels 504a (and/or the detector pixel grid 402 has detector pixels 404). In some examples, the number of higher resolution radiograph pixels 504b may be some other multiple (e.g., 2, 6, 8, 10, etc.) of the number of lower resolution radiograph pixels 504a (and/or detector pixels 404). Nevertheless, both 2D radiographs 500 (and the detector pixel grid 402 in FIG. 4) are shown as occupying (and/or being representative of) the same total area.

In some examples, the greater pixel density of the higher resolution 2D radiograph 500b may allow for a more detailed depiction of the sample 102 than the lower resolution 2D radiograph 500a. This is exhibited in FIGS. 5a-5b, where both 2D radiographs 500 show a gradual progression from very light to very dark, but the higher resolution 2D radiograph 500b shows a finer, more gradual, progression than the lower resolution 2D radiograph 500b.

In the example of FIG. 1, the X-ray machine 100 includes a positioning system 199 comprising a detector positioner 150, a sample positioner 110, and an emitter-detector positioner 160. In some examples, the detector positioner 150 is configured to move the X-ray detector 108 to different detector positions (e.g., for sub-pixel sampling). As shown, the detector positioner 150 includes two parallel pillars 152 connected by two parallel rails 154. As shown the X-ray detector 108 is retained on the rails 154. In some examples, the X-ray detector 108 may be retained on (and/or attached to) the rails 154 by one or more intermediary supports.

In some examples, the detector positioner 150 may be configured to move the X-ray detector 108 along the rails 154 toward and/or away from either pillar 152. In some examples, the rails 154 may be configured to move (e.g., up and/or down) along and/or parallel to the pillars 152, thereby also moving the X-ray detector 108 along and/or parallel to the pillars 152. While illustrated simply in the example of FIG. 1, in some examples, the detector positioner 150 may be more complex, similar to the x translation stage 18, y translation stage 20, detector mounting frame 26, and/or x/y stage linear encoders 22/24 shown and described in U.S. Pat. No. 9,459,217, entitled "High-Resolution Computed Tomography," and having a § 371 date of Sep. 30, 2015, the entire contents of which are hereby incorporated by reference.

In some examples, the sample 102 may be moved by the sample positioner 110. In the example of FIG. 1, the sample positioner 110 retains the sample 102 in the path of the X-ray radiation 104, between the X-ray emitter 106 and X-ray detector 108. In some examples, the sample positioner 110 may be configured to move the sample 102 towards and/or away from the X-ray emitter 106 and/or X-ray detector 108, thereby changing the geometric magnification (defined as the distance between the X-ray emitter 106 and the X-ray detector 108 divided by the distance between the X-ray emitter 106 and the sample 102). In some examples, the sample positioner 110 may be configured to move and/or rotate the sample 102 so that a desired portion and/or orientation of the sample 102 is located in the path of the X-ray radiation 104. In some examples, the sample positioner 110 may position the sample 102 at different angles/orientations with respect to the X-ray emitter 106 and/or X-ray detector 108 in order to obtain 2D radiographs 500a at different orientations, which may then be used to generate one or more three dimensional (3D) images of the sample 102.

In the example of FIG. 1, the sample positioner 110 includes a rotatable fixture 112 upon which the sample 102 is positioned. As shown, the rotatable fixture 112 is a circular plate. As shown, the rotatable fixture 112 is attached to a motorized spindle 116, through which the rotatable fixture 112 may be rotated about an axis defined by the spindle 116. In some examples, one or more alternative and/or additional rotation mechanisms may be provided.

In the example of FIG. 1, the rotatable fixture 112 is supported by a support structure 118. In some examples, the support structure 118 may be configured to translate the rotatable fixture 112 (and/or the sample 102) toward and/or away from the X-ray emitter 106 and/or the X-ray detector 108. In some examples, the support structure 118 may include one or more actuators configured to impart the translation(s).

While one example sample positioner 110 is shown in the example of FIG. 1, in some examples a different sample positioner 110 may be used. For example, a robotic object positioner may be used to translate and/or rotate the sample 102. Likewise, while shown as a circular plate in the example of FIG. 1, in some examples, the rotatable fixture 112 may instead comprise a different fixture, such as, for example, a clamp, clasp, gripper, and/or other retention mechanism. In some examples, the X-ray emitter 106 and the X-ray detector 108 may instead be rotated around the sample 102, rather than (or in addition to) the sample 102 being rotated by the rotatable fixture 112 (as might be helpful if the sample 102 is cumbersome, for example).

In the example of FIG. 1, the X-ray machine 100 further includes an emitter-detector positioner 160. In the example of FIG. 1, the emitter-detector positioner 160 is depicted as a rotatable platform. In some examples, the emitter-detector positioner 160 is configured to move the X-ray emitter 106 and the X-ray detector 108 around the sample 102. In the example of FIG. 1, the emitter-detector positioner 160 is shown elevated above, and connected to, the X-ray emitter 106 and the X-ray detector 108, such as might occur when implemented using a gantry system, for example.

In some examples, the emitter-detector positioner 160 may instead be differently implemented, such as via a platform built into a floor of the X-ray machine 100, one or more robotic movers, a conveyor, and/or one or more other appropriate means. In some examples, the emitter-detector positioner 160 may be configured for rotation around a different (e.g., horizontal, diagonal, etc.) axis, with the X-ray emitter 106 and/or the X-ray detector 108 repositioned accordingly.

In some examples, one or more portions of the sample positioner 110 (e.g., the support structure 118) may be altered and/or omitted to facilitate use (e.g. line of sight) of the X-ray emitter 106 and the X-ray detector 108 when moved around the sample 102 by the emitter-detector positioner 160. In some examples, the emitter-detector positioner 160 may be configured to maintain the same geometric magnification of the X-ray machine 100 when moving the X-ray emitter 106 and the X-ray detector 108 around the sample 102. While much of this disclosure discusses rotating the sample 102 during the accelerated higher resolution radiograph process 300, in some examples, the X-ray emitter 106 and the X-ray detector 108 may instead be rotated around the sample 102, as discussed above.

Figure 2:
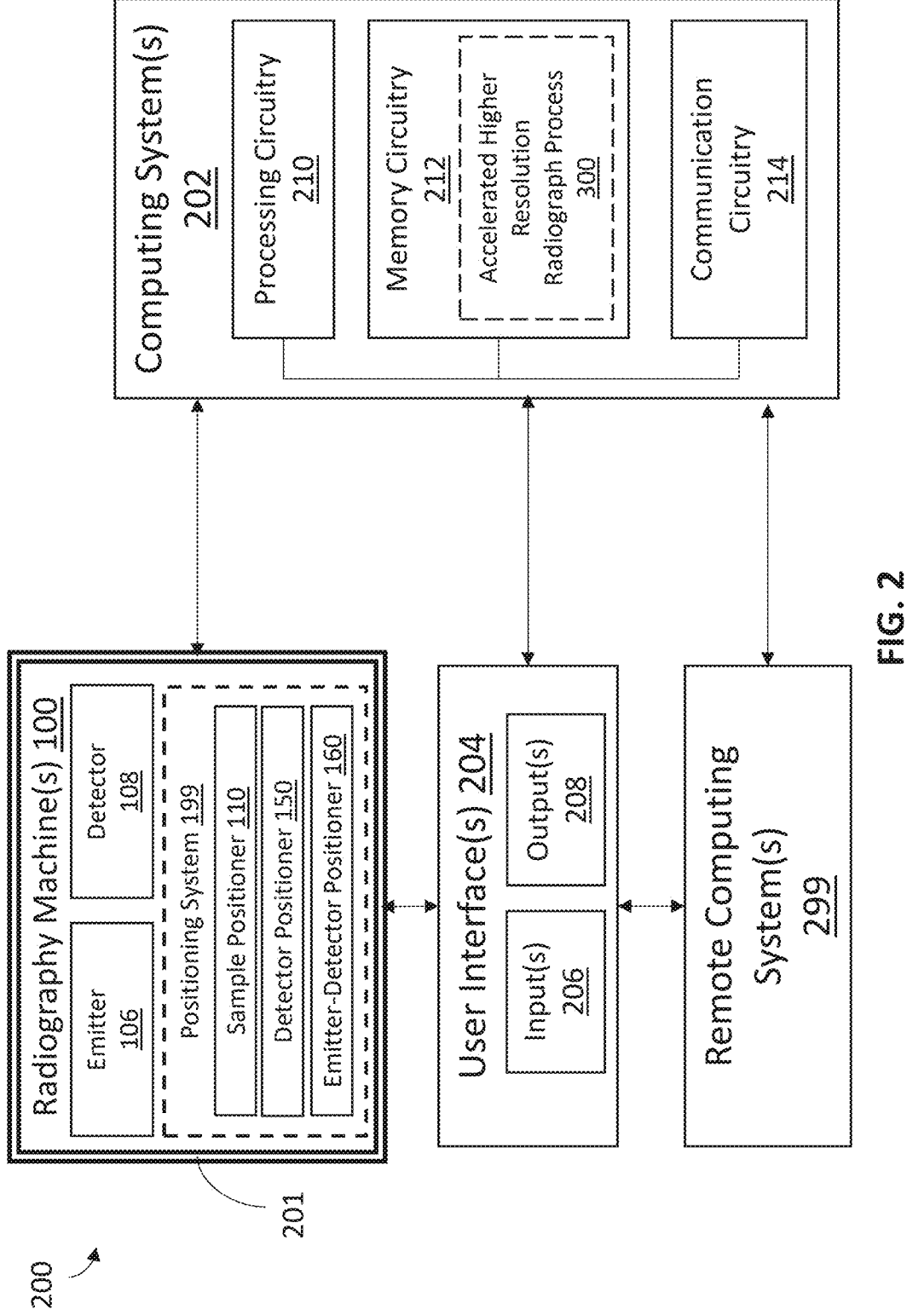
FIG. 2 is a block diagram showing an example X-ray radiography system having the industrial X-ray radiography machine of FIG. 1, in accordance with aspects of this disclosure.

FIG. 2 shows an example of an X-ray radiography system 200 that includes an X-ray radiography machine 100, such as, for example, the X-ray radiography machine 100 shown in FIG. 1. As shown, the X-ray radiography system 200 also includes a computing system 202, a user interface (UI) 204, and a remote computing system 299. While only one X-ray radiography machine 100, computing system 202, UI 204, and remote computing system 299 are shown in the example of FIG. 2, in some examples the X-ray radiography system 200 may include several X-ray radiography machines 100, computing systems 202, UIs 204, and/or remote computing systems 299.

In the example of FIG. 2, the X-ray radiography machine 100 has an emitter 106, detector 108, and positioning system 199 (comprising the sample positioner 110, detector positioner 150, and emitter-detector positioner 160) enclosed within a housing 201. As shown, the X-ray radiography machine 100 is connected to and/or in communication with the computing system(s) 202 and UI(s) 204. In some examples, the X-ray radiography system 100 may also be in electrical communication with the remote computing system(s) 299. In some examples, the communications and/or connections may be electrical, electromagnetic, wired, and/or wireless.

In the example of FIG. 2, the UI 204 includes one or more input devices 206 and/or output devices 208. In some examples, the one or more input devices 206 may comprise one or more touch screens, mice, keyboards, buttons, switches, slides, knobs, microphones, dials, and/or other electromechanical input devices. In some examples, the one or more output devices 208 may comprise one or more display screens, speakers, lights, haptic devices, and/or other devices. In some examples, a user may provide input to, and/or receive output from, the X-ray radiography machine(s) 100, computing system(s) 202, and/or remote computing system(s) 299 via the UI(s) 204.

In some examples, the UI(s) 204 may be part of the computing system 202. In some examples, the computing system 202 may implement one or more controllers of the X-ray radiography machine(s) 100. In some examples, the computing system 202 together with the UI(s) 204 may comprise an image acquisition system of the X-ray radiography system 200. In some examples, the remote computing system(s) 299 may be similar or identical to the computing system 202.

In the example of FIG. 2, the computing system 202 is in (e.g., electrical) communication with the X-ray radiography machine(s) 100, UI(s) 204, and remote computing system(s) 299. In some examples, the communication may be direct communication (e.g., through a wired and/or wireless medium) or indirect communication, such as, for example, through one or more wired and/or wireless networks (e.g., local and/or wide area networks). As shown, the computing system 202 includes processing circuitry 210, memory circuitry 212, and communication circuitry 214 interconnected with one another via a common electrical bus.

In some examples, the processing circuitry 210 may comprise one or more processors. In some examples, the communication circuitry 214 may include one or more wireless adapters, wireless cards, cable adapters, wire adapters, radio frequency (RF) devices, wireless communication devices, Bluetooth devices, IEEE 802.11-compliant devices, WiFi devices, cellular devices, GPS devices, Ethernet ports, network ports, lightning cable ports, cable ports, etc. In some examples, the communication circuitry 214 may be configured to facilitate communication via one or more wired media and/or protocols (e.g., Ethernet cable(s), universal serial bus cable(s), etc.) and/or wireless mediums and/or protocols (e.g., near field communication (NFC), ultra high frequency radio waves (commonly known as Bluetooth), IEEE 802.11x, Zigbee, HART, LTE, Z-Wave, WirelessHD, WiGig, etc.).

In the example of FIG. 2, the memory circuitry 212 comprises and/or stores an accelerated higher resolution radiograph process 300. In some examples, the accelerated higher resolution radiograph process 300 may be implemented via machine readable (and/or processor executable) instructions stored in memory circuitry 212 and/or executed by the processing circuitry 210. In some examples, the accelerated higher resolution radiograph process 300 may execute as part of a larger scanning and/or imaging process of the X-ray radiography system 200. While some of the disclosure below discusses the accelerated higher resolution radiograph process 300 performing certain actions, this should be understood as a shorthand for one or more components of the X-ray radiography system 200 (e.g., processing circuitry 210, communication circuitry 214, UI 204, radiography machine 100, etc.) performing the action(s) as part of the accelerated higher resolution radiograph process 300.

In some examples the accelerated higher resolution radiograph process 300 may use sub-pixel sampling in conjunction with pixel analytics to generate one or more higher resolution 2D radiographs 500b faster than traditional sub-pixel sampling. While in some traditional sub-pixel sampling examples, several lower resolution 2D radiographs 500a are captured, and the lower resolution radiograph pixels 504a of the lower resolution 2D radiographs are used to set the pixel value of all the higher resolution radiograph pixel 504b, in the accelerated higher resolution radiograph process 300, the lower resolution radiograph pixels 504a are only used to set the pixel values for a first portion, rather than all, of higher resolution radiograph pixels 504b. The pixel values of the remaining portion of the higher resolution radiograph pixel 504b are set using an analysis of the pixel values of the first portion of higher resolution radiograph pixels 504b. Because only a portion, rather than all, of the pixel values of the higher resolution pixels are set using lower resolution 2D radiographs, fewer lower resolution 2D radiographs 500a need be captured, thereby saving time and/or reducing wear and tear on the radiography machine 100, while still providing quality higher resolution 2D radiographs.

Figure 3A:
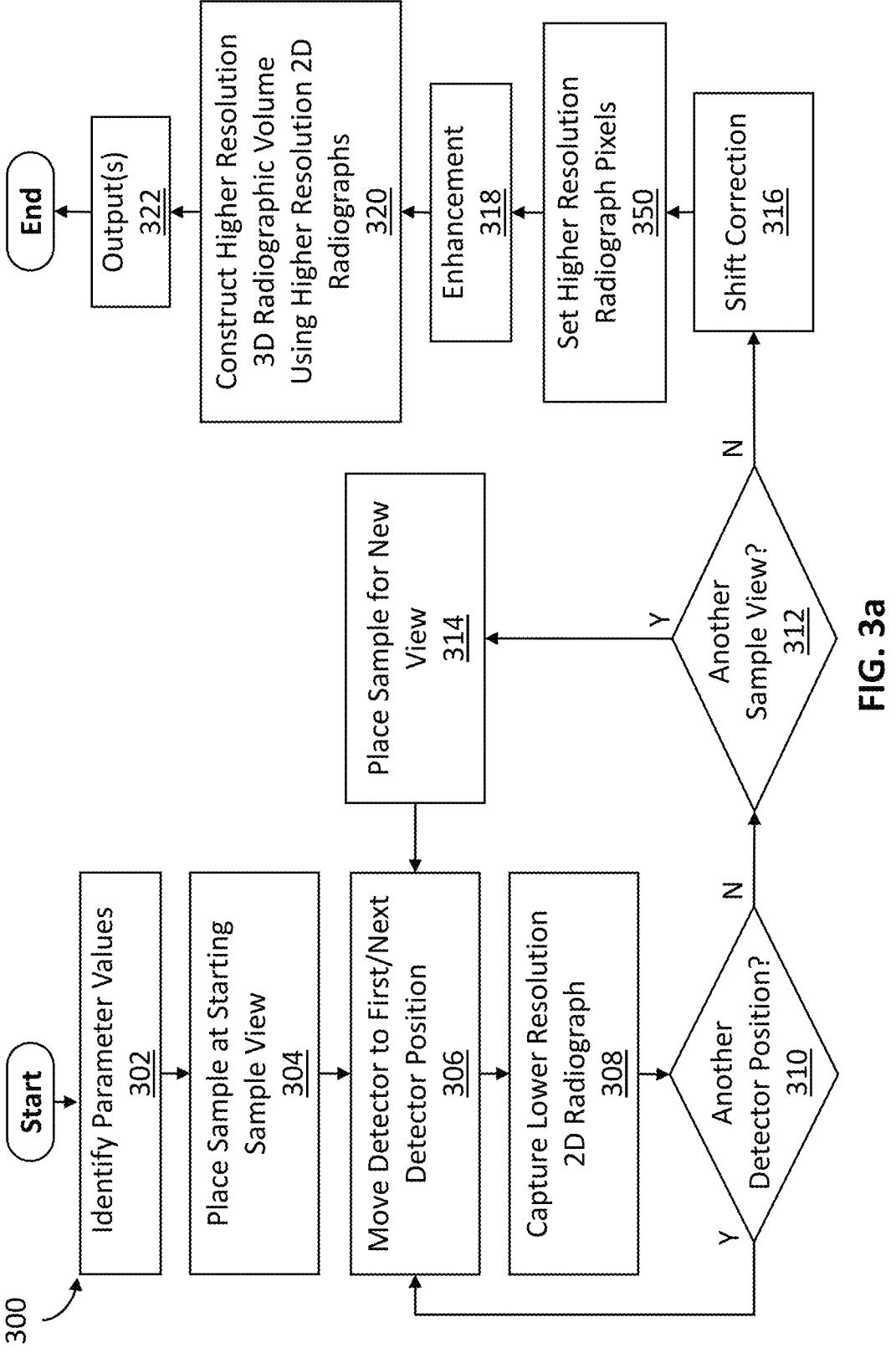
FIGS. 3a-3b are flowcharts illustrating an example operation of an accelerated higher resolution radiography process of the X-ray radiography system of FIG. 2, in accordance with aspects of this disclosure.

FIG. 3a is a flowchart illustrating example operation of the accelerated higher resolution radiograph process 300. In the example of FIG. 3a, the accelerated higher resolution radiograph process 300 begins at block 302. At block 302, the accelerated higher resolution radiograph process 300 identifies one or more parameter values that may be used during the accelerated higher resolution radiograph process 300.

In some examples, the parameter values may include values relating to a type/size/geometry of the sample 102, a starting position/orientation/magnification of the sample 102, a target total rotation amount of the sample 102 (e.g., between 1-360 degrees, inclusive), a target rotation increment of the sample 102 (e.g., 1 degrees, 5 degrees, etc.), a geometric magnification, a target higher resolution, a resolution of the X-ray detector 108, one or more target positions of the X-ray detector 108, one or more target position changes of the X-ray detector 108, one or more position change triggers of the X-ray detector 108, one or more target analyses, one or more shift correction techniques, and/or other relevant information. In some examples, the accelerated higher resolution radiograph process 300 may prompt the user for one or more of the parameter values, such as, for example, via the UI 204.

In some examples, the accelerated higher resolution radiograph process 300 may automatically identify one or more of the parameter values (e.g., if not provided via the UI 204). For example, the accelerated higher resolution radiograph process 300 may default to 360-degrees, if the target total rotation amount of the sample 102 remains unset. In some examples, the accelerated higher resolution radiograph process 300 may automatically identify one or more of the parameter values based on one or more other parameter values. For example, the accelerated higher resolution radiograph process 300 may identify an ideal (and/or default) geometric magnification value based on the resolution of X-ray detector 108 and/or the target higher resolution, such as through a data structure (e.g., look up table, database) stored in memory circuitry 212, and/or dynamic algorithmic calculation.

In the example of FIG. 3a, after block 302, the accelerated higher resolution radiograph process 300 proceeds to block 304 where the accelerated higher resolution radiograph process 300 arranges the X-ray detector 108, X-ray emitter 106, and/or sample 102 (e.g., via positioning system 199) to present a starting view (e.g., orientation, magnification, or position) of the sample 102 (e.g., relative to the X-ray detector 108 and/or X-ray emitter 106). In some examples, the starting view of the sample 102 may be determined based on one or more parameter values entered and/or determined at block 302. In some examples, the starting view will place the sample 102 at a particular orientation relative to the X-ray detector 108 (and/or X-ray emitter 106).

After block 302, the accelerated higher resolution radiograph process 300 proceeds to block 306 where the accelerated higher resolution radiograph process 300 moves the X-ray detector 108 (e.g., via positioning system 199) to a first detector position. In some examples, the first detector position may be determined based on one or more parameter values entered and/or determined at block 302. In some examples, the accelerated higher resolution radiograph process 300 may use one or more sensors (e.g., position sensor(s), angular sensor(s), etc.) of the radiography machine 100 to determine the position of the X-ray detector 108, and/or when the X-ray detector 108 has been properly positioned.

After block 306, the accelerated higher resolution radiograph process 300 proceeds to block 308 where the accelerated higher resolution radiograph process 300 captures a lower resolution 2D radiograph 500a based on the X-ray radiation 104 incident on the X-ray detector 108 while the X-ray detector 108 is at the first detector position and the sample 102 is at the starting view. In some examples, the sample 102 and/or X-ray detector 108 is held stationary (e.g., via the positioning system 199) when capturing the lower resolution 2D radiograph 500. In some examples, the lower resolution 2D radiograph 500a may be stored in memory circuitry 212.

In the example of FIG. 3a, after block 308, the accelerated higher resolution radiograph process 300 proceeds to block 310 where the accelerated higher resolution radiograph process 300 determines whether the X-ray detector 108 should be moved to another detector position while the sample 102 is at the same view. In some examples, the determination may be made based on one or more parameter values entered and/or determined at block 302, and/or the number of times the X-ray detector 108 has previously been moved (and/or the number of times blocks 306-310 have executed) while the sample 102 is at the same view.

In some examples, the accelerated higher resolution radiograph process 300 may only use one detector position while the sample 102 is at a given view. In some examples, the accelerated higher resolution radiograph process 300 may use two or more detector position while the sample 102 is at a given view. In some examples where more than one detector position is used, each detector position used by the accelerated higher resolution radiograph process 300 while the sample 102 is at a given view may be offset from each other (or at least one other) detector position used while the sample 102 is at the given view by less than the pixel length of a detector pixel 404 (e.g., less than a pixel width in the x axis and/or a pixel height in the y axis).

Figures 6, 7:
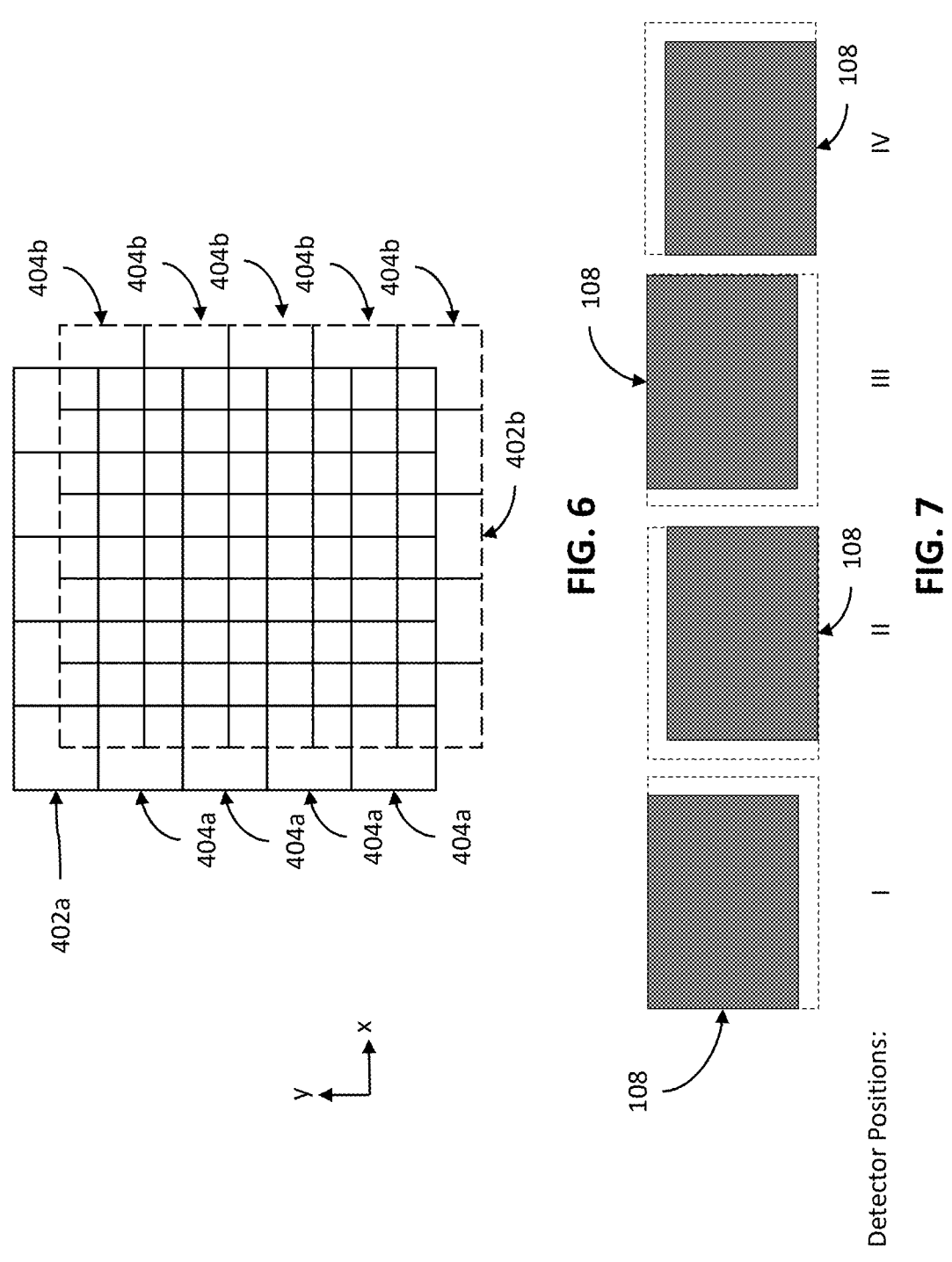
FIG. 6 illustrates how the example pixel grid of FIG. 3 may be shifted by less than a sub-pixel to a different detector position, in accordance with aspects of this disclosure.
FIG. 7 illustrates different example detector positions of the X-ray detector 108 of the industrial X-ray radiography machine of FIG. 1, in accordance with aspects of this disclosure.

FIG. 6 shows an example of how two detector positions may be offset from one another by less than a detector pixel length. In the example of FIG. 6, two different detector pixel grids 402 of detector pixels 404 are shown, indicating two different positions of the X-ray detector 108. The first detector pixel grid 402a of detector pixels 404a is depicted using solid lines, while a second detector pixel grid 402b of detector pixels 404b is depicted using dashed lines. As shown, the two different detector pixel grids 402 are offset from one another by less than the pixel length. In particular, the position of detector pixel grid 402b is offset from the position of detector pixel grid 402a by a half detector pixel 404 in the positive x direction and a half pixel in the negative y direction (resulting in an offset of less than a detector pixel 404 in the diagonal direction). Such an offset of less than a pixel length of a detector pixel 404 may be referred to as a sub-pixel offset. While the detector pixel grids 402 are shown as being offset from one another in the diagonal direction for reasons of clarity and explanation, in some examples the detector pixel grids 402 may be offset in just the x axis, or just the y axis.

FIG. 7 shows an example of four different detector positions offset from one another by a sub-pixel, the four positions being: I, II, III, and IV. In the example of FIG. 7, the larger dotted line rectangle represents an outer perimeter (and/or maximum range of motion) of the X-ray detector 108 throughout all the different detector positions: I, II, III, and IV. The X-ray detector 108 is shown as a smaller solid gray rectangle that is positioned within the dotted line rectangle at the different detector positions: I, II, III, and IV. As shown, each detector position is offset from each other detector position by less than a detector pixel 404.

In the example of FIG. 7, the first detector position (I) and the second detector position (II) of the X-ray detector 108 correspond to the positions of the solid line detector pixel grid 402a and dotted line detector pixel grid 402b in FIG. 6. In terms of position within the dotted line perimeter, the X-ray detector 108 is at the top left in the first detector position (I) and at the bottom left in the second detector position (II). The depicted third detector position (III) and the fourth detector position (IV) are approximate mirrored positions of the first detector position (I) and the second detector position (II), respectively. In terms of position within the dotted line perimeter, the X-ray detector 108 is at the top right in the third detector position (III) and at the bottom right in the fourth detector position (IV).

In the example of FIG. 3a, the accelerated higher resolution radiograph process 300 returns to block 306 and moves the X-ray detector 108 to the next detector position if the accelerated higher resolution radiograph process 300 determines that the X-ray detector 108 should be moved to a different detector position at block 310. For example, the first detector position might be the detector position I shown in FIG. 7, and the next detector position might be the detector position II shown in FIG. 7 that is offset from the detector position I by a sub-pixel. Then, at block 308, the accelerated higher resolution radiograph process 300 captures another lower resolution 2D radiograph 500b while the X-ray detector 108 is at the new detector position, similar to that which is discussed above. After block 308, the accelerated higher resolution radiograph process 300 again determines whether the X-ray detector 108 should be moved to a different detector position at block 310, as discussed above. Blocks 306-310 continue to execute until the accelerated higher resolution radiograph process 300 determines whether the X-ray detector 108 should not be moved to a different detector position at block 310.

In some examples, the number of detector positions used by the accelerated higher resolution radiograph process 300 while the sample 102 is at a given view may be less than the number of higher resolution radiograph pixels 504b in a higher resolution 2D radiograph 500b divided by the number of lower resolution radiograph pixels 504a in a lower resolution 2D radiograph 500a. So, for example, where there are four times as many higher resolution radiograph pixels 504b than there are lower resolution radiograph pixels 504b (as shown, for example, in FIGS. 5a-5b), the number of detector positions used by the accelerated higher resolution radiograph process 300 while the sample 102 is at a given view may be less than four. This is in contrast to some traditional sub-pixel sampling examples where, in such an example, the X-ray detector 108 might be moved to the four positions (I, II, III, IV) shown in FIG. 7.

If the accelerated higher resolution radiograph process 300 determines the X-ray detector 108 should not be moved to a new detector position at block 310, the accelerated higher resolution radiograph process 300 proceeds to block 312, where the accelerated higher resolution radiograph process 300 determines whether another view (e.g., orientation, magnification, or position) of the sample 102 is called for (e.g., based on the parameter(s) identified at block 302). For example, if a higher resolution three dimensional (3D) radiographic volume, model, and/or image is to be constructed (e.g., using several higher resolution 2D radiographs 500a), the accelerated higher resolution radiograph process 300 may determine that another orientation of the sample 102 is called for until the sample 102 has been in rotated 360-degrees. In contrast, if only a single higher resolution 2D radiograph 500a is desired, the accelerated higher resolution radiograph process 300 may determine that there is no need for another orientation of the sample 102. In another example, the accelerated higher resolution radiograph process 300 may determine that another orientation of the sample is called for if several higher resolution 2D radiographs 500a are desired, even though no 3D radiographic volume will be constructed. In another example, the accelerated higher resolution radiograph process 300 may determine that the parameters call for a different magnification or position (e.g., relative to the X-ray detector 108 or X-ray emitter 106) of the sample 102.

In the example of FIG. 3a, if the accelerated higher resolution radiograph process 300 determines another view of the sample 102 is called for, the accelerated higher resolution radiograph process 300 proceeds to block 314, where accelerated higher resolution radiograph process 300 moves the sample 102 and/or the X-ray emitter 106 and X-ray detector 108 (e.g., via the positioning system 199) to place the sample 102 at the next view. In some examples, the next view of the sample 102 may be determined based on the current view of the sample 102 and/or one or more of the parameters identified at block 302. For example, the parameter(s) may identify a particular sequence of orientations for the sample 102, or an incremental degree of rotation by which to change the orientation of the sample 102 a certain number of times or until a final target orientation or degree of rotation is reached. In some examples, the accelerated higher resolution radiograph process 300 may use one or more sensors (e.g., position sensor(s), angular sensor(s), etc.) of the radiography machine 100 to determine the view of the sample 102 (e.g., relative to the X-ray emitter 106 and/or X-ray detector 108), and/or when the next view of the sample 102 has been achieved.

After block 314, the accelerated higher resolution radiograph process 300 returns to block 306 where the accelerated higher resolution radiograph process 300 moves the X-ray detector 108 to another detector position. In some examples, this movement may be a sub-pixel movement (e.g., moving the X-ray detector 108 from detector position II back to detector position I, or from detector position II to detector position III or IV). In some examples, this movement may be skipped (e.g., keeping the X-ray detector 108 at detector position II).

While, in the example of FIG. 3a, the detector position determination of block 310 is shown as controlling the inner loop, while the sample view determination of block 312 is shown as controlling the outer loop, in some examples, this arrangement may be reversed. In such a reversal, blocks 306 and 314 may effectively switch positions, and blocks 310 and 312 may effectively switch positions. However, such a reversal may make shift correction more difficult, as discussed below.

In the example of FIG. 3a, blocks 306-314 continue to repeat until the accelerated higher resolution radiograph process 300 determines lower resolution 2D radiographs 500a need be captured at no further views of the sample 102. Once this determination is made, the accelerated higher resolution radiograph process 300 proceeds to block 316, where the higher resolution radiograph process 300 performs a shift correction on the captured lowered resolution 2D radiographs 500a.

Shift correction refers to a correction to an unintended and/or unwanted shift in a focal spot of the radiation on the X-ray detector 108 that may occur over time, such as due to thermal effects. In some examples, this shift in focal spot may result in a shift in perspective of lower resolution 2D radiographs 500a. In some examples, the degree of shift that occurs over the time it takes to perform a 360-degree scan may be measured based on a comparison of two lower resolution 2D radiographs 500a taken at a start and end of the 360-degree scan, where the X-ray detector 108 is at the same position, and the sample 102 is at the same orientation (e.g., at 0 degrees of rotation and 360 degrees of rotation of sample 102), for both lower resolution 2D radiographs 500a. In some examples, a corrective action may be determined based on the shift, and applied to one or more lower resolution 2D radiographs 500a captured during the 360-degree scan to compensate for the shift. This shift correction may increase the quality and/or consistency of the lower resolution 2D radiographs 500a. As shift correction requires a full 360-degree scan (and/or rotation of the sample 102), block 316 may be skipped where such a full 360-degree scan (and/or rotation of the sample 102) does not occur.

Traditional 360-degree sub-pixel sampling scans may not be able to take advantage of shift correction. This is because, in traditional 360-degree sub-pixel sampling scans (e.g., with 3D reconstruction), the X-ray detector 108 is only moved from a first detector position (e.g., detector position I) to a second detector position (e.g., detector position II) after a full 360-degree scan (and/or rotation of the sample 102) is completed. Furthermore, the shift in focal spot may be different during different scans (and/or 360-degree rotations of the sample 102). Thus, even if the shift was measured at the end of a first full scan, when the X-ray detector 108 is at the first detector position (e.g., detector position I), and at the end of the second full scan, when the X-ray detector 108 is at the second detector position (e.g., detector position II), the measured shifts of the two scans might be markedly different. Therefore, the determined corrections might be markedly different. If the different corrections are applied to their respective sets of lower resolution 2D radiographs 500a, and then the two sets of lower resolution 2D radiographs 500a are interlaced to generate the a higher resolution 2D radiograph 500b, lower image quality, loss of detail, lower sharpness, blurring, distortions, artifacts, and/or other negative consequences may occur.

In contrast, in the example accelerated higher resolution radiograph process 300 shown in FIG. 3a only one 360-degree scan (and/or rotation of the sample 102) need be performed. All the different detector positions of the X-ray detector 108 may be accomplished during the one 360-degree scan (and/or rotation of the sample 102).

Thus, for example, detector positions I and II may be used when the sample 102 is at 0 and 360-degrees of rotation. In such an example, shift may be measured at by comparing lower resolution 2D radiographs 500a obtained at 0 and 360 degrees for detector positions I and/or II. And since the time difference between the capture of the lower resolution radiographs 500a at detector positions I and II will be minimal, the difference in measured shift and/or determined correction should be minimal. Indeed, in some examples, only one shift may be measured to save time. Thereby, shift correction may be applied in the accelerated higher resolution radiograph process 300, resulting in increased quality and/or consistency of the lower resolution 2D radiographs 500a.

In the example of FIG. 3a, after shift correction of the lower resolution 2D radiographs 500a, the accelerated higher resolution radiograph process 300 generates one or more higher resolution 2D radiographs 500b, and/or sets the pixel values for the higher resolution 2D radiograph(s) 500b, at block 350, during an accelerated higher resolution pixel setting process 350. In some examples, pixel values for the higher resolution radiograph pixels 504b are set using pixel values of the lower resolution radiograph pixels 504 of the lower resolution 2D radiograph(s) 500a captured at block 308.

Figure 3B:
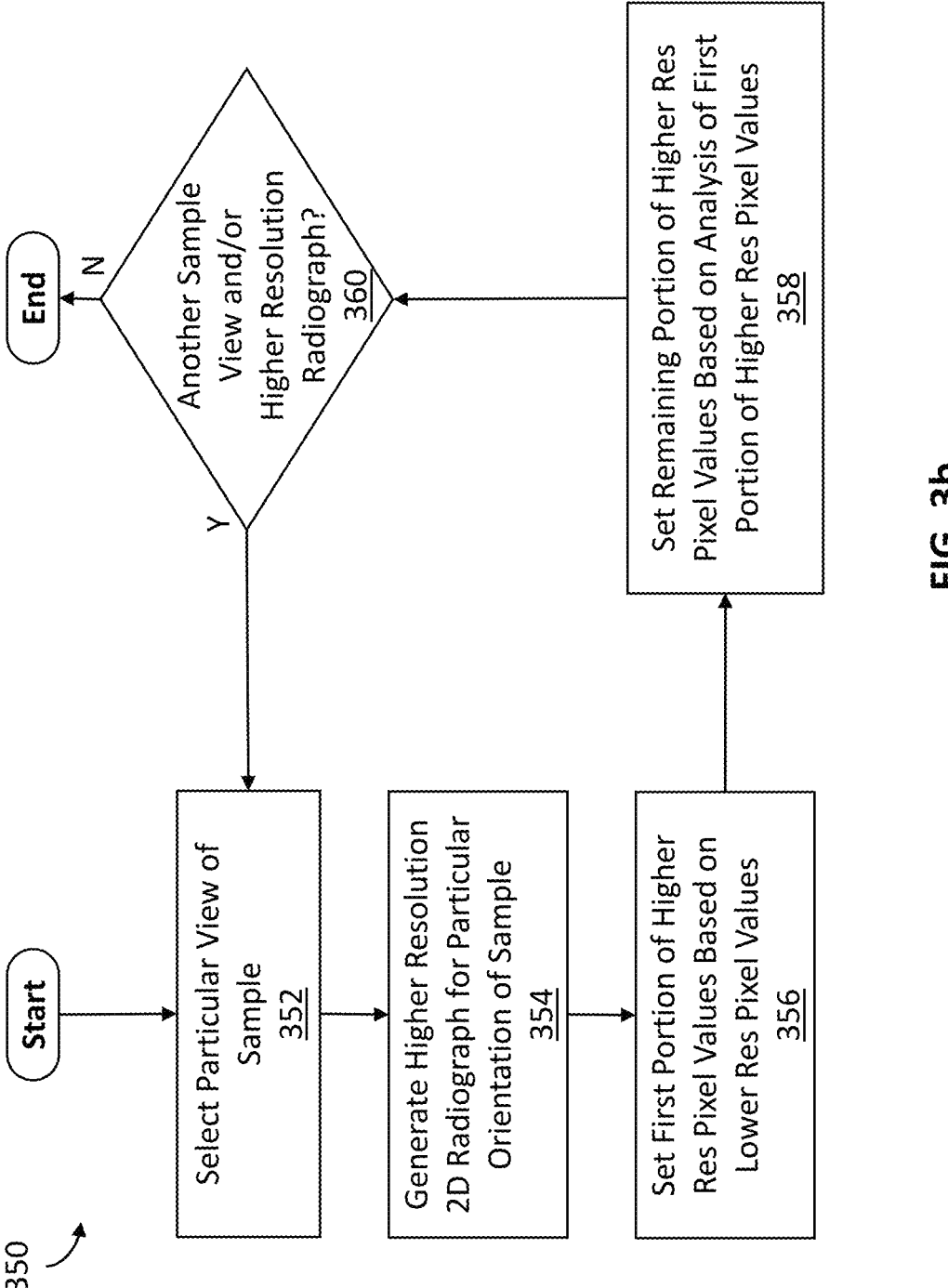

FIG. 3b is a flowchart illustrating example operation of the accelerated higher resolution pixel setting process 350. As shown, the accelerated higher resolution pixel setting process 350 begins at block 352, where the accelerated higher resolution pixel setting process 350 identifies a particular view of the sample 102 for which to generate the higher resolution 2D radiograph 500b. In some examples, this particular view may first be the lowest degree of rotation of the sample 102 for which a lower resolution 2D radiograph 500a was captured (e.g., 0 degrees, 1 degrees, etc.). After selecting a particular orientation at block 352, the accelerated higher resolution pixel setting process 350 generates an "empty" higher resolution 2D radiograph 500*b* (e.g., with no set pixel values) for that particular orientation at block 354.

At block 356, the accelerated higher resolution pixel setting process 350 sets the pixel values for a first portion of the higher resolution radiograph pixels 504*b* of the higher resolution 2D radiograph 500*b*. In some examples, the first portion of the higher resolution radiograph pixels 504*b* may include fewer higher resolution radiograph pixels 504*b* than the total number of higher resolution radiograph pixels 504*b* in the higher resolution 2D radiograph 500*b*. In some examples, the number of higher resolution radiograph pixels 504*b* in the first portion is equal to the total number of higher resolution radiograph pixels 504*b* in the higher resolution 2D radiograph 500*b*, divided by the total number of lower resolution radiograph pixels 504*a* in a lower resolution 2D radiograph 500*b*, multiplied by the number of lower resolution 2D radiograph(s) 500*a* captured at block 308 for the particular view.

In some examples, the pixel values for the first portion of the higher resolution radiograph pixels 504*b* are set based on the lower resolution 2D radiograph(s) 500*a* captured at block 308 for the particular view of the sample 102. In particular, the pixel values for the first portion of the higher resolution radiograph pixels 504*b* are set based on the pixel values of the lower resolution radiograph pixels 504*a* of the lower resolution 2D radiograph(s) 500*a* captured at block 308 for the particular view of the sample 102.

In some examples, each lower resolution radiograph pixel 504*a* of each lower resolution 2D radiograph(s) 500*a* captured at block 208 for the particular view is used to set the pixel value of one higher resolution radiograph pixel 504*b* that is in the same area as the lower resolution radiograph pixel 504*a*. For example, in FIGS. 5*a*-5*b*, the lower resolution radiograph pixel 504*a* in the top left corner of the lower resolution 2D radiograph 500*a* covers the same area as four higher resolution radiograph pixels 504*b* in the top left corner of the higher resolution 2D radiograph 500*b*. Thus, in some examples, the lower resolution radiograph pixel 504*a* in the top left corner of the lower resolution 2D radiograph 500*a* would be used to set the pixel value of one of the four higher resolution radiograph pixels 504*b* in the top left corner of the higher resolution 2D radiograph 500*b*.

In some examples, the detector position of the X-ray detector 108 when the lower resolution 2D radiograph 500*a* is captured may determine which of the higher resolution radiograph pixels 504*b* in the covered area is set. For example, the top left corner lower resolution radiograph pixel 504*a* of the lower resolution 2D radiograph 500*a* captured when the X-ray detector 108 is at the top left detector position I may be used to set the top left corner higher resolution radiograph pixel 504*b* in the higher resolution 2D radiograph 500*b*. As another example, the top left corner lower resolution radiograph pixel 504*a* of the lower resolution 2D radiograph 500*a* captured when the X-ray detector 108 is at the bottom right detector position II may be used to set the higher resolution radiograph pixel 504*b* that is diagonally adjacent the top left corner higher resolution radiograph pixel 504*b* in the higher resolution 2D radiograph 500*b*.

Figure 8B:
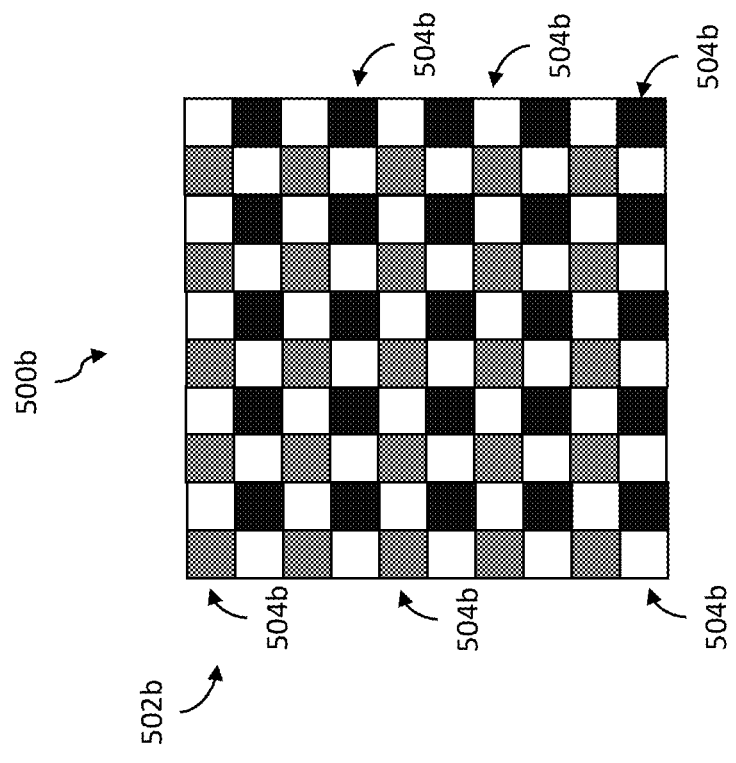
FIGS. 8a-8b illustrate an example of how different lower resolution radiograph pixels of different lower resolution 2D radiographs of FIG. 5a could be combined to set pixel values of a first portion of higher resolution radiograph pixels of the higher resolution 2D radiograph of FIG. 5b, in accordance with aspects of this disclosure.
Figure 8A:
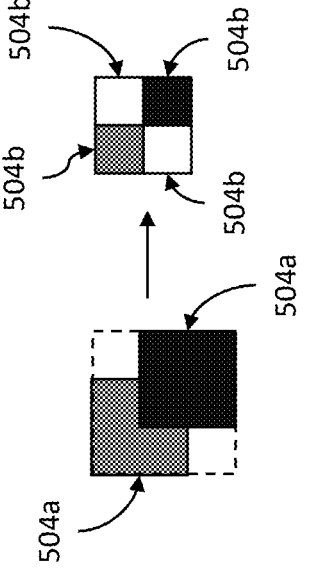

This positional relationship between detector position and pixel position is illustrated, for example, in FIG. 8*a*. In the example of FIG. 8*a*, the gray lower resolution radiograph pixel 504*a* in the top left of the dashed line rectangle is representative of the top left corner lower resolution radiograph pixel 504*a* of the lower resolution 2D radiograph 500*a* captured when the X-ray detector 108 is at the top left detector position I. The black lower resolution radiograph pixel 504*a* in the bottom right of the dashed line rectangle is representative of the top left corner lower resolution radiograph pixel 504*a* of the lower resolution 2D radiograph 500*a* captured when the X-ray detector 108 is at the bottom right detector position II.

In the example of FIG. 8*a*, the top left higher resolution radiograph pixel 504*b* is the same gray color as the top left lower resolution radiograph pixel 504*a*, illustrating that the pixel (e.g., grayscale) value of the top left higher resolution radiograph pixel 504*b* has been set according (and/or identical) to pixel value of the top left lower resolution radiograph pixel 504*a*. Similarly, the bottom right higher resolution radiograph pixel 504*b* is the same black color as the bottom right lower resolution radiograph pixel 504*a*, illustrating that the pixel (e.g., grayscale) value of the bottom right higher resolution radiograph pixel 504*b* has been set according (and/or identical) to pixel value of the bottom right lower resolution radiograph pixel 504*a*.

In some traditional sub-pixel sampling examples, the top right and bottom left higher resolution radiograph pixels 504*b* would similarly be set using lower resolution radiograph pixels 504*a* from lower resolution 2D radiographs 500*a* captured when the X-ray detector 108 is at the top right detector position III and bottom left detector position IV. However, in the example of FIG. 8*a*, the top right and bottom left high resolution radiograph pixels 504*b* are shown as being white to signify that they are "empty," with unset pixel values. While traditional sub-pixel sampling may set the pixel values for all the higher resolution radiograph pixel 504*b* based on lower resolution radiograph pixels 504*a*, this requires capture of more lower resolution 2D radiographs 500*a*. In contrast, the higher resolution radiograph process 300 (and/or accelerated higher resolution pixel setting process 350) only sets the pixel values of a first portion of the higher resolution radiograph pixel 504*b*. This technique of setting pixel values of only some, rather than all, of the higher resolution radiograph pixels 504*b* based on lower resolution radiograph pixels 504*a* means that fewer lower resolution 2D radiographs 500*a* need be captured, thereby saving significant time and requiring fewer movements of the X-ray detector 108 (which may save on wear and tear).

Because fewer lower resolution 2D radiographs 500*a* are captured than needed to set the pixel value for each higher resolution radiograph pixel 504*a*, a portion of unset (and/or "empty") higher resolution radiograph pixels 504*b* will remain after the pixel values of the first portion of higher resolution radiograph pixels 504*b* are set at block 356. This situation is depicted, for example, in FIG. 8*b*, where the first portion (e.g. half) of the higher resolution radiograph pixels 504*b* are colored gray or black, illustrating that their pixel values have been set, while the remaining (e.g., half) portion of the high resolution radiograph pixels 504*b* are colored white to represent lack of any pixel value. In the example of FIG. 3*b*, the pixel values of the remaining portion of higher resolution radiograph pixels 504*b* are set by the accelerated higher resolution pixel setting process 350 at block 358.

In some examples, the accelerated higher resolution pixel setting process 350 sets the pixel values of the remaining portion of higher resolution radiograph pixels 504*b* based on an analysis of the pixel values of the first portion of higher resolution radiograph pixels 504*b*. In some examples, the analysis may include and/or use some (e.g., bicubic, linear, bilinear, nearest neighbor, etc.) interpolation of nearby, adjacent, and/or surrounding first portion high resolution radiograph pixels 504*b*. Adjacent in this context may refer to a high resolution radiograph pixel 504*b* that is neighboring laterally along the x axis, vertically along the y axis, and/or diagonally along a diagonal axis that bisects the x and y axes.

In some examples, the analysis may include and/or use artificial intelligence mechanisms. For example, the analysis may include and/or use one or more neural networks, clustering algorithms, and/or pattern matching techniques that are trained on and/or use a repository (e.g., stored in memory circuitry 212) of previously captured lower resolution 2D radiographs 500*a* and/or higher resolution 2D radiographs 500*b*.

Research has shown that the quality and/or amount of detail in the higher resolution 2D radiographs 500*b* is still very high and/or only mildly diminished by setting the remaining high resolution radiograph pixels 504 using some analysis of the pixel values of the first portion of higher resolution radiograph pixels 504*b*. And, the generation of the higher resolution 2D radiograph 500*b* is significantly faster since fewer lower resolution 2D radiographs 500*a* need be captured. Additionally, the fewer lower resolution 2D radiograph 500*a* captures may necessitate fewer movements of the X-ray detector 108 (e.g., via the positioning system 199), which can save on wear and tear.

In the example of FIG. 3*b*, the accelerated higher resolution pixel setting process 350 determines whether there is another view of the sample 102 for which a higher resolution 2D radiograph 500*b* that should be generated at block 360. If so, the accelerated higher resolution pixel setting process 350 iterates to the next view at block 352 and then loops through blocks 354-358 again for that view of the sample 102. If not, the accelerated higher resolution pixel setting process 350 ends, and the accelerated higher resolution radiograph process 300 proceeds to block 318.

In the example of FIG. 3*a*, the accelerated higher resolution radiograph process 300 enhances one or more of the higher resolution 2D radiographs 500 generated during the accelerated higher resolution pixel setting process 350 at block 318. In some examples, the enhancement at block 318 may include deconvolution. In some examples, the enhancement may include and/or use one or more artificial intelligence mechanisms, similar to those discussed above. While shown as executing at the end of the block 306-314 loop, in some examples, blocks 316, 350, and/or 318 may execute after each loop of blocks 306-310.

After block 318, the accelerated higher resolution radiograph process 300 proceeds to block 320, where the accelerated higher resolution radiograph process 300 assembles the higher resolution 2D radiographs 500*b* into one or more higher resolution 3D volumes (if so desired and/or possible). In some examples, the accelerated higher resolution radiograph process 300 may additionally take one or more particular slices of a higher resolution 2D radiograph 500*b* from the higher resolution 3D volume(s) (e.g., based on some user selected or stored parameters). In some examples, the slice(s) may be different than any higher resolution 2D radiograph 500*b* previously generated and/or acquired.

In the example of FIG. 3*b*, after block 320, the accelerated higher resolution radiograph process 300 proceeds to block 322, where one or more (e.g., visual) representations of the higher resolution 3D volumes and/or higher resolution 2D radiographs 500*b* may be output to the user via the output device(s) 208 of the UI 204 and/or stored in memory circuitry 212. Following block 322, the accelerated higher resolution radiograph process 300 ends.

The X-ray radiography system 200 discussed herein allows for generation of higher resolution 2D radiographs

500*b* using an accelerated higher resolution radiograph process 300. In particular, the accelerated higher resolution radiograph process 300 uses pixel (e.g., grayscale) values from one or more lower resolution 2D radiographs 500*a* to set pixel values for a first portion of higher resolution radiograph pixels 504*b* of a higher resolution 2D radiograph 500*b*. The remaining portion of the higher resolution radiograph pixels 504*b* are set based on an analysis of the first portion. The accelerated higher resolution radiograph process 300 is faster than more traditional processes because the accelerated higher resolution radiograph process 300 necessitates fewer lower resolution radiographs be captured, and therefore saves time and/or lower wear and tear on the radiography machine 100, while still providing quality higher resolution 2D radiographs 500*b*.

The present methods and/or systems may be realized in hardware, software, or a combination of hardware and software. The present methods and/or systems may be realized in a centralized fashion in at least one computing system, or in a distributed fashion where different elements are spread across several interconnected computing and/or remote computing systems. Any kind of computing system or other apparatus adapted for carrying out the methods described herein is suited. A typical combination of hardware and software may be a general-purpose computing system with a program or other code that, when being loaded and executed, controls the computing system such that it carries out the methods described herein. Another typical implementation may comprise an application specific integrated circuit or chip. Some implementations may comprise a non-transitory machine-readable (e.g., computer readable) medium (e.g., FLASH drive, optical disk, magnetic storage disk, or the like) having stored thereon one or more instructions (e.g., lines of code) executable by a machine, thereby causing the machine to perform processes as described herein.

While the present method and/or system has been described with reference to certain implementations, it will be understood by those skilled in the art that various changes may be made and equivalents may be substituted without departing from the scope of the present method and/or system. In addition, many modifications may be made to adapt a particular situation or material to the teachings of present disclosure without departing from its scope. Therefore, it is intended that the present method and/or system not be limited to the particular implementations disclosed, but that the present method and/or system will include all implementations falling within the scope of the appended claims.

As used herein, "and/or" means any one or more of the items in the list joined by "and/or". As an example, "x and/or y" means any element of the three-element set {(x), (y), (x, y)}. In other words, "x and/or y" means "one or both of x and y". As another example, "x, y, and/or z" means any element of the seven-element set {(x), (y), (z), (x, y), (x, z), (y, z), (x, y, z)}. In other words, "x, y and/or z" means "one or more of x, y and z".

As utilized herein, the terms "e.g.," and "for example" set off lists of one or more non-limiting examples, instances, or illustrations.

As used herein, the terms "coupled," "coupled to," and "coupled with," each mean a structural and/or electrical connection, whether attached, affixed, connected, joined, fastened, linked, and/or otherwise secured. As used herein, the term "attach" means to affix, couple, connect, join, fasten, link, and/or otherwise secure. As used herein, the term "connect" means to attach, affix, couple, join, fasten, link, and/or otherwise secure.

As used herein the terms "circuits" and "circuitry" refer to physical electronic components (i.e., hardware) and any software and/or firmware ("code") which may configure the hardware, be executed by the hardware, and or otherwise be associated with the hardware. As used herein, for example, a particular processor and memory may comprise a first "circuit" when executing a first one or more lines of code and may comprise a second "circuit" when executing a second one or more lines of code. As utilized herein, circuitry is "operable" and/or "configured" to perform a function whenever the circuitry comprises the necessary hardware and/or code (if any is necessary) to perform the function, regardless of whether performance of the function is disabled or enabled (e.g., by a user-configurable setting, factory trim, etc.).

As used herein, a control circuit may include digital and/or analog circuitry, discrete and/or integrated circuitry, microprocessors, DSPs, etc., software, hardware and/or firmware, located on one or more boards, that form part or all of a controller, and/or are used to control a welding process, and/or a device such as a power source or wire feeder.

As used herein, the term "processor" means processing devices, apparatus, programs, circuits, components, systems, and subsystems, whether implemented in hardware, tangibly embodied software, or both, and whether or not it is programmable. The term "processor" as used herein includes, but is not limited to, one or more computing devices, hardwired circuits, signal-modifying devices and systems, devices and machines for controlling systems, central processing units, programmable devices and systems, field-programmable gate arrays, application-specific integrated circuits, systems on a chip, systems comprising discrete elements and/or circuits, state machines, virtual machines, data processors, processing facilities, and combinations of any of the foregoing. The processor may be, for example, any type of general purpose microprocessor or microcontroller, a digital signal processing (DSP) processor, an application-specific integrated circuit (ASIC), a graphic processing unit (GPU), a reduced instruction set computer (RISC) processor with an advanced RISC machine (ARM) core, etc. The processor may be coupled to, and/or integrated with a memory device.

As used, herein, the term "memory" and/or "memory device" means computer hardware or circuitry to store information for use by a processor and/or other digital device. The memory and/or memory device can be any suitable type of computer memory or any other type of electronic storage medium, such as, for example, read-only memory (ROM), random access memory (RAM), cache memory, compact disc read-only memory (CDROM), electro-optical memory, magneto-optical memory, programmable read-only memory (PROM), erasable programmable read-only memory (EPROM), electrically-erasable programmable read-only memory (EEPROM), a computer-readable medium, or the like. Memory can include, for example, a non-transitory memory, a non-transitory processor readable medium, a non-transitory computer readable medium, non-volatile memory, dynamic RAM (DRAM), volatile memory, ferroelectric RAM (FRAM), first-in-first-out (FIFO) memory, last-in-first-out (LIFO) memory, stack memory, non-volatile RAM (NVRAM), static RAM (SRAM), a cache, a buffer, a semiconductor memory, a magnetic memory, an optical memory, a flash memory, a flash card, a compact flash card, memory cards, secure digital memory cards, a microcard, a minicard, an expansion card, a smart card, a memory stick, a multimedia card, a picture card, flash storage, a subscriber identity module (SIM) card, a hard drive (HDD), a solid state drive (SSD), etc. The memory can be configured to store code, instructions, applications, software, firmware and/or data, and may be external, internal, or both with respect to the processor.

What is claimed is:

1. A non-transitory computer readable medium, comprising machine readable instructions which, when executed by processing circuitry, cause the processing circuitry to:

capture a lower resolution radiograph of a sample using radiation emitted by a radiation emitter and detected by a radiation detector, the sample being positioned between the radiation emitter and the radiation detector in a radiation path of the radiation; and generate a higher resolution radiograph of the sample based on the lower resolution radiograph, the higher resolution radiograph comprising more pixels than the lower resolution radiograph, the higher resolution radiograph having higher resolution pixels, and the higher resolution radiograph being generated by:

setting first higher resolution pixel values for a first portion of the higher resolution pixels based on lower resolution pixel values of the lower resolution radiograph, and setting remaining higher resolution pixel values for a remaining portion of the higher resolution pixels of the higher resolution radiograph using an analysis of the first higher resolution pixel values for the first portion of the higher resolution pixels.

2. The non-transitory computer readable medium of claim 1, wherein the lower resolution radiograph of the sample comprises a first lower resolution radiograph of the sample while the radiation detector is at a first detector position and the sample is at a sample orientation relative to the radiation emitter or the radiation detector, the lower resolution pixel values comprising first lower resolution pixel values, the non-transitory computer readable medium further comprising machine readable instructions which, when executed by the processing circuitry, further cause the processing circuitry to:

capture a second lower resolution radiograph of the sample while the radiation detector is at a second detector position and the sample is at the sample orientation, wherein the first higher resolution pixel values for the first portion of the higher resolution pixels are set based on the first lower resolution pixel values of the first lower resolution radiograph and second lower resolution pixel values of the second lower resolution radiograph.

3. The non-transitory computer readable medium of claim 2, wherein the radiation detector includes a detector surface comprising a plurality of detector pixels, each detector pixel of the plurality of detector pixels having a detector pixel size defined by a detector pixel width along a first detector axis and a detector pixel height along a second detector axis that is perpendicular to the first detector axis, the second detector position being offset from the first detector position by a first distance along the first detector axis or a second distance along the second detector axis, the first distance, being less than the detector pixel width, or the second distance being less than the detector pixel height.

4. The non-transitory computer readable medium of claim 3, further comprising machine readable instructions which, when executed by the processing circuitry, further cause the processing circuitry to: move the radiation detector from the first detector position to the second detector position using a positioning system.

5. The non-transitory computer readable medium of claim 1, further comprising machine readable instructions which, when executed by the processing circuitry, further cause the processing circuitry to: display a visual representation of the higher resolution radiograph on a display screen.

6. The non-transitory computer readable medium of claim 1, further comprising machine readable instructions which, when executed by the processing circuitry, further cause the processing circuitry to: apply an enhancement to the higher resolution pixels of the higher resolution radiograph.

7. The non-transitory computer readable medium of claim 1, further comprising machine readable instructions which, when executed by the processing circuitry, further cause the processing circuitry to: construct a three-dimensional higher resolution radiographic volume using the higher resolution radiograph and one or more additional higher resolution radiographs.

8. An industrial radiography imaging system, comprising:
  a radiation emitter configured to emit radiation along a radiation path;
  a radiation detector positioned in the radiation path of the radiation, the radiation detector configured to detect the radiation emitted by the radiation emitter;
  a sample support positioned between the radiation emitter and the radiation detector, the sample support configured to support a sample at a sample position in the radiation path of the radiation; and
  an image acquisition system, the image acquisition system comprising:
    processing circuitry, and
    memory circuitry comprising machine readable instructions which, when executed by the processing circuitry, cause the processing circuitry to:
      capture a lower resolution radiograph of the sample using the radiation detected by the radiation detector, and
      generate a higher resolution radiograph of the sample based on the lower resolution radiograph, the higher resolution radiograph comprising more pixels than the lower resolution radiograph, the higher resolution radiograph having higher resolution pixels, and the higher resolution radiograph being generated by:
        setting first higher resolution pixel values for a first portion of the higher resolution pixels based on lower resolution pixel values of the lower resolution radiograph, and
        setting remaining higher resolution pixel values for a remaining portion of the higher resolution pixels of the higher resolution radiograph using an analysis of the first higher resolution pixel values for the first portion of the higher resolution pixels.

9. The industrial radiography imaging system of claim 8, wherein the lower resolution radiograph of the sample comprises a first lower resolution radiograph of the sample while the radiation detector is at a first detector position and the sample is at a sample orientation relative to the radiation emitter or the radiation detector, the lower resolution pixel values comprising first lower resolution pixel values, and the memory circuitry further comprising machine readable instructions which, when executed by the processing circuitry, further cause the processing circuitry to:

capture a second lower resolution radiograph of the sample while the radiation detector is at a second detector position and the sample is at the sample orientation,
wherein the first higher resolution pixel values for the first portion of the higher resolution pixels are set based on the first lower resolution pixel values of the first lower resolution radiograph and second lower resolution pixel values of the second lower resolution radiograph.

10. The industrial radiography imaging system of claim 9, wherein the radiation detector includes a detector surface comprising a plurality of detector pixels, each detector pixel of the plurality of detector pixels having a detector pixel size defined by a detector pixel width along a first detector axis and a detector pixel height along a second detector axis that is perpendicular to the first detector axis, the second detector position being offset from the first detector position by a first distance along the first detector axis or a second distance along the second detector axis, the first distance being less than the detector pixel width, or the second distance being less than the detector pixel height.

11. The industrial radiography imaging system of claim 10, further comprising: a positioning system configured to move the radiation detector from the first detector position to the second detector position.

12. The industrial radiography imaging system of claim 8, wherein the image acquisition system further comprises: a display screen configured to display a visual representation of the higher resolution radiograph.

13. The industrial radiography imaging system of claim 8, wherein the memory circuitry further comprises machine readable instructions which, when executed by the processing circuitry, further cause the processing circuitry to: apply an enhancement to the higher resolution pixels of the higher resolution radiograph.

14. The industrial radiography imaging system of claim 8, wherein the memory circuitry further comprises machine readable instructions which, when executed by the processing circuitry, further cause the processing circuitry to:
  construct a three-dimensional higher resolution radiographic volume using the higher resolution radiograph and one or more additional higher resolution radiographs.

15. A method for an accelerated generation of a higher resolution radiograph, the method comprising:
  capturing a lower resolution radiograph of a sample using radiation emitted by a radiation emitter and detected by a radiation detector, the sample being positioned between the radiation emitter and the radiation detector in a radiation path of the radiation; and
  generating, via processing circuitry, a higher resolution radiograph of the sample based on the lower resolution radiograph, the higher resolution radiograph comprising more pixels than the lower resolution radiograph, the higher resolution radiograph having higher resolution pixels, and the higher resolution radiograph being generated by:
    setting, via the processing circuitry, first higher resolution pixel values for a first portion of the higher resolution pixels based on lower resolution pixel values of the lower resolution radiograph, and
    setting, via the processing circuitry, remaining higher resolution pixel values for a remaining portion of the higher resolution pixels of the higher resolution radiograph using an analysis of the first higher resolution pixel values for the first portion of the higher resolution pixels.

16. The method of claim 15, wherein the lower resolution radiograph of the sample comprises a first lower resolution radiograph of the sample while the radiation detector is at a first detector position and the sample is at a sample orientation relative to the radiation emitter or the radiation detector, the lower resolution pixel values comprising first lower resolution pixel values, the method further comprising:

capturing a second lower resolution radiograph of the sample using the radiation detector while the radiation detector is at a second detector position and the sample is at the sample orientation, wherein the first higher resolution pixel values for the first portion of the higher resolution pixels are set based on the first lower resolution pixel values of the first lower resolution radiograph and second lower resolution pixel values of the second lower resolution radiograph.

17. The method of claim 16, wherein the radiation detector includes a detector surface comprising a plurality of detector pixels, each detector pixel of the plurality of detector pixels having a detector pixel size defined by a detector pixel width along a first detector axis and a detector pixel height along a second detector axis that is perpendicular to the first detector axis, the second detector position being offset from the first detector position by a first distance along the first detector axis or a second distance along the second detector axis, the first distance being less than the detector pixel width, or the second distance being less than the detector pixel height.

18. The method of claim 17, further comprising: moving the radiation detector from the first detector position to the second detector position using a positioning system.

19. The method of claim 15, further comprising:

applying an enhancement to the higher resolution pixels of the higher resolution radiograph via the processing circuitry; and displaying a visual representation of the higher resolution radiograph on a display screen.

20. The method of claim 15, further comprising: constructing, via the processing circuitry, a three-dimensional higher resolution radiographic volume using the higher resolution radiograph and one or more additional higher resolution radiographs.

\* \* \* \* \*